(12) United States Patent
Duisken et al.

(10) Patent No.: US 10,399,736 B2
(45) Date of Patent: Sep. 3, 2019

(54) PLANAR COMPOSITE HAVING LAYERS OF PLASTIC OF DIFFERENT DAMPING PROPERTIES

(71) Applicant: SIG Technology AG, Neuhausen (CH)

(72) Inventors: Mike Duisken, Linnich (DE); Roland Bothor, Aachen (DE)

(73) Assignee: SIG Technology AG, Neuhausen (CH)

( * ) Notice: Subject to any disclaimer, the term of this patent is extended or adjusted under 35 U.S.C. 154(b) by 1045 days.

(21) Appl. No.: 14/415,713

(22) PCT Filed: Jul. 18, 2013

(86) PCT No.: PCT/EP2013/002144
§ 371 (c)(1),
(2) Date: Jan. 19, 2015

(87) PCT Pub. No.: WO2014/023393
PCT Pub. Date: Feb. 13, 2014

(65) Prior Publication Data
US 2015/0225111 A1    Aug. 13, 2015

(30) Foreign Application Priority Data
Jul. 19, 2012    (DE) .................. 10 2012 014 261

(51) Int. Cl.
*B32B 27/10*    (2006.01)
*B32B 27/32*    (2006.01)
(Continued)

(52) U.S. Cl.
CPC .............. *B65D 5/563* (2013.01); *B31B 50/26* (2017.08); *B31B 50/64* (2017.08); *B32B 27/10* (2013.01);
(Continued)

(58) Field of Classification Search
USPC ............. 428/517, 35.2, 98, 220; 264/173.19, 264/173.14; 525/240, 352
See application file for complete search history.

(56) References Cited

U.S. PATENT DOCUMENTS 5,444,145 A * 8/1995 Brant .................... C08F 210/16
526/127
6,521,734 B1    2/2003 Araki et al.
(Continued)

FOREIGN PATENT DOCUMENTS

EP    1 020 480    7/2000
EP    1 777 238    4/2007
(Continued)

OTHER PUBLICATIONS

International Search Report and Written Opinion of the International Searching Authority dated Sep. 4, 2013, which issued during prosecution of International Application No. PCT/EP2013/002144, which corresponds to the present application.

*Primary Examiner* — Lee E Sanderson
*Assistant Examiner* — Michael C Romanowski
(74) *Attorney, Agent, or Firm* — Troutman Sanders LLP

(57) ABSTRACT

The present invention relates generally to a planar composite including, as a layer sequence, a first PE blend layer, a carrier layer, a barrier layer, and a further PE blend layer. The first PE blend layer or the further PE blend layer in each case includes in a range of from 10 to 50 wt. %, in each case based on the blend, a first LDPEa, and a further LDPEt to the extent of at least 50 wt. %, in each case based on the blend. The present invention furthermore relates to a process for the production of the planar composite, a container which surrounds an interior and comprises at least one such planar composite, and a process for the production of the container including the steps of provision of the planar composite of
(Continued)

the abovementioned layer construction, folding, joining and optionally filling and closing of the container.

20 Claims, 9 Drawing Sheets

(51) Int. Cl.
  *B65D 5/56* (2006.01)
  *C08L 23/06* (2006.01)
  *B65B 5/06* (2006.01)
  *B65B 43/10* (2006.01)
  *B31B 50/26* (2017.01)
  *B31B 50/64* (2017.01)

(52) U.S. Cl.
  CPC ............... *B32B 27/32* (2013.01); *B65B 5/06* (2013.01); *B65B 43/10* (2013.01); *C08L 23/06* (2013.01); *B32B 2255/205* (2013.01); *B32B 2255/26* (2013.01); *B32B 2307/7244* (2013.01); *B32B 2439/70* (2013.01); *C08L 2205/025* (2013.01); *Y10T 428/1352* (2015.01); *Y10T 428/24331* (2015.01); *Y10T 428/24942* (2015.01); *Y10T 428/31678* (2015.04); *Y10T 428/31902* (2015.04); *Y10T 428/31938* (2015.04)

(56) References Cited

U.S. PATENT DOCUMENTS

| | | | |
|---|---|---|---|
| 8,278,393 | B2 | 10/2012 | Nummila-Pakarinen et al. |
| 2005/0181154 | A1* | 8/2005 | Toft ................. B32B 3/266 428/34.2 |
| 2007/0225445 | A1* | 9/2007 | Nguyen ............ C08L 23/06 525/240 |
| 2008/0248228 | A1 | 10/2008 | Aubee et al. |
| 2009/0156749 | A1* | 6/2009 | Nummila-Pakarinen ........ C08F 10/02 525/240 |
| 2010/0304062 | A1* | 12/2010 | Daviknes ........ B32B 27/32 428/35.2 |
| 2010/0317804 | A1 | 12/2010 | Karjala et al. |
| 2013/0021396 | A1 | 1/2013 | Hirano |
| 2017/0326856 | A1* | 11/2017 | Kalihari ........... B32B 27/32 |

FOREIGN PATENT DOCUMENTS

| | | |
|---|---|---|
| WO | 90/09926 | 9/1990 |
| WO | 2008/031540 | 3/2008 |
| WO | 2010/144784 | 12/2010 |

\* cited by examiner

PLANAR COMPOSITE HAVING LAYERS OF PLASTIC OF DIFFERENT DAMPING PROPERTIES

CROSS REFERENCE TO RELATED APPLICATIONS

This application is a U.S. National Phase Application under 35 U.S.C. § 371 of International Patent Application No. PCT/EP2013/002144 filed Jul. 18, 2013 which claims priority to German Patent Application No. 10 2012 014 261.7 filed Jul. 19, 2012. The entire contents of these applications are hereby incorporated by reference.

FIELD OF TECHNOLOGY

The present invention relates generally to a planar composite comprising as a layer sequence: i. a first PE blend layer; ii. a carrier layer; iii. a barrier layer; iv. a further PE blend layer; wherein the first PE blend layer or the further PE blend layer in each case comprises in a range of from 10 to 50 wt. %, in each case based on the blend, a first LDPEa; a further LDPEt to the extent of at least 50 wt. %, in each case based on the blend. The present invention furthermore relates to a process for the production of the planar composite, a container which surrounds an interior and comprises at least one such planar composite, and a process for the production of this container which comprises the steps of provision of the planar composite of abovementioned layer construction, folding, joining and optionally filling and closing of the container obtained in this way.

BACKGROUND

For a long time foodstuffs, whether foodstuffs for human consumption or also animal feed products, have been preserved by being stored either in a can or in a glass jar closed with a lid. However, these packaging systems have some serious disadvantages, inter alia the high intrinsic weight, the energy-intensive production and the troublesome opening.

Alternative packaging systems for storing foodstuffs for a long period of time as far as possible without impairment are known from the prior art. These are containers produced from planar composites—often also called laminate. Such planar composites are often built up from a layer of thermoplastic, a carrier layer usually made of cardboard or paper, an adhesion promoter layer, an aluminium layer and a further layer of plastic. Such a planar composite is disclosed, inter alia, in WO 90/09926. Such laminated containers already have many advantages over the conventional glass jars and cans, for example space-saving storage and low intrinsic weight.

The use of "low-density polyethylene, LDPE" layers in the production of containers such as are described in EP 1 020 480 and EP 1 777 238 represents a further development of such planar composites. In these, the polymer coatings are produced by an autoclave process with a subsequent extruding process of the polymer on a carrier. A controlled pressure and temperature programme for the production process can be achieved with the aid of these autoclave processes. Nevertheless, possibilities for improvement also exist for these packaging systems.

Thus, in the production process, in particular during application of the polymer layers of the abovementioned containers, tearing off of the PE layers or perforation occurs again and again, especially in the creasing regions of the containers. Damage and defects in the packaging can consequently occur, as a result of which this is damaged visually and functionally, above all inside the planar composite. This is particularly undesirable, since this step is at the end of the creation of value and higher costs are therefore caused by withdrawal of damaged packs and claims due to leaks.

In the case of containers with scores in particular, in these chiefly at the container creasing points, such tearing off of the polymer layer can lead to malfunctions, such as leakiness, which are noticed only during use, for example filling or even only later by shortened storage times of such a container.

Generally, the object of present invention is to at least partly eliminate the disadvantages emerging from the prior art.

The object is furthermore to provide a planar composite which has a high stability and leakproofness.

An object is furthermore to provide a container from a composite, wherein the container can be produced by easy folding of the composite and at the same time should have a high leakproofness. The container should therefore be particularly well-suited to long-term storage of sensitive foodstuffs.

A further object is to provide a planar composite which can be produced efficiently and inexpensively.

An object in turn is to provide a planar composite which can be produced as quickly as possible and without a high reject rate.

A further object is to provide a planar composite which is suitable in particular for the production of containers for transportation and storage of foodstuffs, animal feeds, drinks of low carbonic acid content and the like.

An object is furthermore to provide a process for the production of a planar composite which is as far as possible efficient and inexpensive as well as fast and of low susceptibility to defects.

A further object is to improve the processability of the materials used in the production, in particular to minimize the neck-in during application of thermoplastics by extrusion, in particular of PE layers. A further object in turn is to increase the speed in the production of planar composites, in particular to optimize the draw-down ratio of the materials to be processed.

An object is furthermore to provide a planar composite which tends towards as few defects as possible, in particular during folding in the cold, as a result of which a packaging container having a good leakproofness can be produced.

SUMMARY

In order to make a contribution towards achieving at least one of the abovementioned objects, the present application provides a planar composite including as a layer sequence: a carrier layer; a barrier layer. The layer sequence includes: a first PE blend layer. The first PE blend layer includes in a range of from 10 to 50 wt. %, in each case based on the blend, a first LDPEa, and a further LDPEt to the extent of at least 50 wt. %, in each case based on the blend. The first PE blend layer has a damping factor difference in a range of from −0.3 to −0.6.

In addition, the present application provides a process for the production of a planar composite, wherein the planar composite includes a carrier layer and a barrier layer. The process including the steps of: provision of a first LDPEa and a further LDPEt, wherein the first LDPEa has a damping factor difference of greater than −0.4 and wherein the further LDPEt has a damping factor difference of less than −0.4;

mixing of the first LDPEa and the further LDPEt to give a PE blend, wherein the PE blend comprises in a range of from 10 to 50 wt. %, in each case based on the blend, the first LDPEa, and the further LDPEt to the extent of at least 50 wt. %, in each case based on the PE blend; application of the PE blend to a composite precursor, wherein the composite precursor comprises a carrier layer.

DETAILED DESCRIPTION

Figure 1:
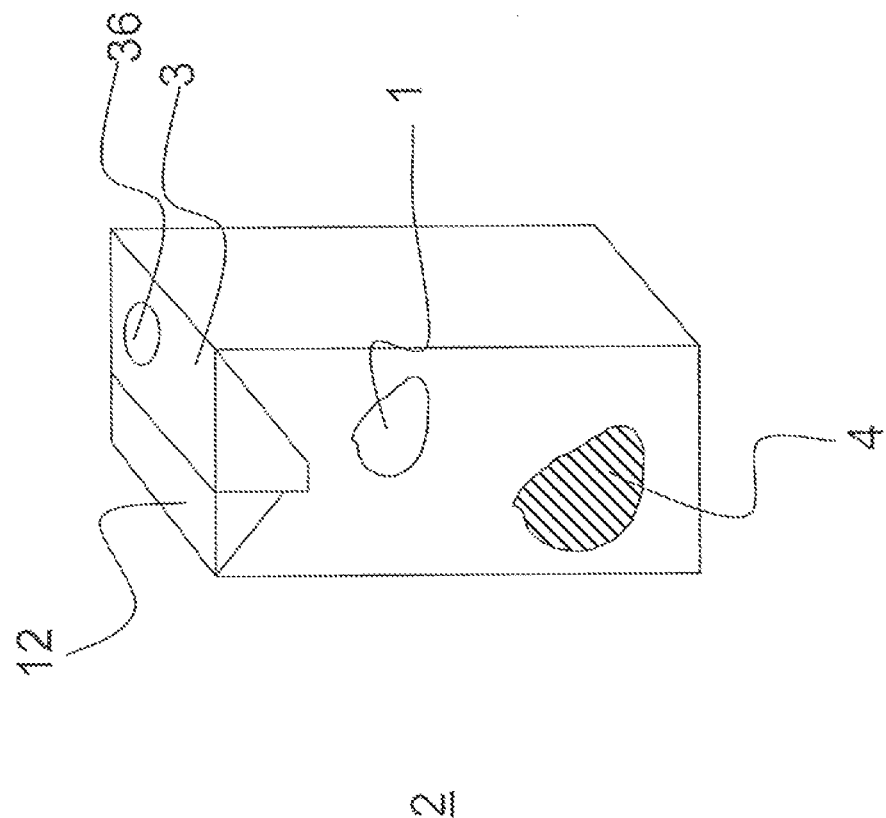
FIG. 1 is a diagram of a container produced by the process according to the invention.

A contribution towards achieving at least one of the abovementioned objects is made by the subject matter of the classifying claims. The subject matter of the sub-claims which are dependent upon the classifying claims represents preferred embodiments of this contribution towards achieving the objects.

A contribution towards achieving at least one of the above objects is made by a planar composite comprising as a layer sequence:
  i. a carrier layer;
  ii. a barrier layer;
wherein the layer sequence comprises a first PE blend layer;
  wherein the first PE blend layer comprises in a range of from 10 to 50 wt. %, in each case based on the blend, a first LDPEa; and
  a further LDPEt to the extent of at least 50 wt. %, in each case based on the blend, as PE blend layer constituents, wherein the sum of all the PE blend layer constituents is 100 wt. %; and
  wherein the first PE blend layer has a damping factor difference in a range of from −0.3 to −0.6.

The first PE blend layer can be provided at any conceivable position of the layer sequence. Thus the first PE blend layer can be provided in a layer sequence with the first PE blend layer followed by the carrier layer and the barrier layer, wherein the layers can follow one another directly and indirectly. Furthermore, the first PE blend layer can be provided in a layer sequence with the carrier layer, followed by the barrier layer, followed by the first PE blend layer, wherein the layers can follow one another directly and indirectly. Furthermore, the first PE blend layer can be provided in a layer sequence with the carrier layer, followed by the first PE blend layer, followed by the barrier layer, wherein the layers can follow one another directly and indirectly.

In one embodiment of the composite according to the invention, it is preferable for the layer sequence to comprise a further PE blend layer;
  wherein the further PE blend layer comprises in a range of from 10 to 50 wt. %, in each case based on the blend, a first LDPEa; and a further LDPEt to the extent of at least 50 wt. %, in each case based on the blend; and
  wherein the further PE blend layer has a damping factor difference in a range of from −0.3 to −0.6.

The further PE blend layer can be provided at any conceivable position of the layer sequence in addition to the first PE blend layer. Thus the further PE blend layer can be provided in a layer sequence with the first PE blend layer followed by the carrier layer and the barrier layer, followed by the further PE blend layer, wherein the layers can follow one another directly and indirectly. Furthermore, the further PE blend layer can be provided in a layer sequence with the carrier layer, followed by the further PE blend layer, followed by the barrier layer, followed by the first PE blend layer, wherein the layers can follow one another directly and indirectly.

In an embodiment according to the invention, it is preferable for the further LDPEt to be present in a range of from 52 to 90 wt. %, preferably in a range of from 56 to 85 wt. % and particularly preferably in a range of from 60 to 80 wt. %.

The term "joined" or "composite" used in this description includes the adhesion of two objects beyond van der Waals forces of attraction. These objects can either follow one another directly or be joined to one another via further objects. For the planar composite, this means, for example, that the carrier layer can be joined directly and therefore immediately to first PE blend layer, or can also be joined indirectly via an adhesion promoter layer, a direct joining being preferred. Furthermore, the further PE blend layer can also be joined directly and immediately to the barrier layer, but further objects, for example in the form of further polymer layers, may also be positioned in between.

The wording "comprising a layer sequence" as used above means that at least the stated layers can be present in the planar composite according to the invention in the stated sequence. This wording does not necessarily mean that these layers follow one another directly. Furthermore, this wording also does not mean that the sequence of the layers cannot be changed. In a preferred embodiment of the planar composite, the carrier layer is followed by a further PE layer. This can be a PE blend layer, but it can also be a pure PE layer of LDPEa or LDPEt. This wording furthermore includes constellations in which one or more additional layers can moreover be present between two layers mentioned successively in the above sequence. In a preferred embodiment of the planar composite according to the invention, the planar composite comprises a third PE layer, preferably a further PE blend layer.

Furthermore, for example, a further layer or several further layers may also additionally be provided over the complete or a part of the area on the side of the planar composite facing the barrier layer. In particular, a printed layer may also be applied on the side of the further PE layer facing the barrier layer. However, possible further layers are also covering or protective layers. According to another embodiment, it is also possible for a printed layer to be provided between the carrier layer and the first or the further PE blend layer. In this case, the further PE blend layer itself could also be a covering or protective layer for the printed layer.

The first PE blend layer as well as the further, and also all further PE blend layers can have further constituents in addition to the constituents of the LDPEa and LDPEt. The PE blend layer is preferably incorporated into or applied to the planar composite material in an extrusion process from a PE blend which comprises both LDPEa and LDPEt. The further constituents of the PE blend are preferably constituents which do not adversely influence the properties of the PE blend during application as a layer. The further constituents can be, for example, inorganic compounds, such as metal salts, or further plastics, such as further thermoplastics. However, it is also conceivable for the further constituents to be fillers or pigments, for example carbon black or metal oxides. Preferably, the PE blend comprises at least one further thermoplastic. Possible suitable thermoplastics for the further constituents of the PE blend layer are in particular those which can be easily processed due to good extrusion properties. Among these, polymers obtained by chain polymerization are suitable, in particular polyesters or polyolefins, cyclic olefin copolymers (COC), polycyclic olefin copolymers (POC), in particular polyethylene and polypropylene, being particularly preferred and polyethylene being very particularly preferred. Among the polyethylenes, HDPE, MDPE, LDPE, LLDPE, VLDPE and PE and mixtures of at least two of these are preferred. Mixtures of at least two thermoplastics can also be employed.

Suitable PE blend layers have a melt flow rate (MFR) in a range of from 1 to 25 g/10 min, preferably in a range of from 2 to 20 g/10 min and particularly preferably in a range of from 2.5 to 15 g/10 min, and a density in a range of from 0.890 g/cm$^3$ to 0.980 g/cm$^3$, preferably in a range of from 0.895 g/cm$^3$ to 0.975 g/cm$^3$, and further preferably in a range of from 0.900 g/cm$^3$ to 0.970 g/cm$^3$. The PE blend layers preferably have a melting temperature in a range of from 80 to 155° C., preferably in a range of from 90 to 145° C. and particularly preferably in a range of from 95 to 135° C.

The amount of the further constituent in the PE blend layer can be in a range of from 0.1 to 40 wt. %, preferably in a range of from 0.5 to 30 wt. %, particularly preferably in a range of from 1 to 20 wt. %, in each case based on the blend.

The two main constituents of the PE blend form the two LDPE forms LDPEa and LDPEt. The LDPEa differs from the LDPEt in that it is prepared by means of an autoclave process, whereas the LDPEt is prepared by means of a tubular reactor.

In a preferred embodiment of the planar composite, the further LDPEt is obtainable from the reaction in a tubular reactor.

In a further preferred embodiment of the planar composite, the LDPEa is obtainable from the reaction in an autoclave reactor.

Both a tube process in a tubular reactor and an autoclave process in an autoclave reactor are preferably carried out under increased pressure.

In the autoclave process in an autoclave reactor, the polymerization is carried out in an autoclave having a length/diameter ratio in general of between 1 and 25 in the case of a single-zone reactor. In the case of a multi-zone reactor, the ratio of the length of each zone/diameter is as a rule 0.5 to 20, preferably 1 to 10. It goes without saying that the reaction medium flows in the longitudinal direction. The pressure in the autoclave reactor can be, for example, between 100 and 250 MPa, preferably between 120 and 180 MPa, for example between 140 and 170 MPa. The temperature in the autoclave reactor can be between 180 and 300° C. and preferably between 240 and 290° C.

On the basis of the difficulty of producing bimodal molecular weight distributions in tubular processes, the autoclave process is used in parallel. However, the combination of an autoclave reactor in series or in parallel with a tubular reactor is likewise suitable for producing bimodal molecular weight distributions.

The preferred autoclave reactor is a continuous autoclave having a length to diameter ratio of from 1 to 16. The autoclave reactor can comprise one or more reaction zones by incorporation of several baffle systems conventional in the technical field. The autoclave reactor can likewise be present in series with one or more other reactors, and the autoclave reactor can additionally be provided with one or more entry points for monomers.

In the tube process, the polymerization takes place in a tubular reactor. A tubular reactor comprises, for example, cylinders, the diameter of which is usually between 1 cm and 3 m, preferably in a range of from 2 cm to 1 m, particularly preferably in a range of from 3 cm to 50 cm, and the length of which is usually between 0.1 to 3 km. This can correspond to a length to diameter ratio of from 100 to 300,000. The shape of a tubular reactor can be, for example, straight or curved, for example comprising U-shaped regions. A tubular reactor which is configured in the form of a spiral is preferred. In a tubular reactor, the reaction medium is stimulated with a high speed, usually over 2 m per second, and short reaction times, for example between 0.1 and 5 min. The pressure in the tubular reactor can be, for example, between 200 and 350 MPa, preferably between 210 and 280 MPa, for example between 230 and 250 MPa. The temperature in the tubular reactor can be between 120 and 350° C. and preferably between 150 and 300° C.

Both in the autoclave reactor and in the tubular reactor, ethylene which comprises a free radical starter or initiator is passed through a preheating zone, where it heats up to 100-200° C. The mixture is then passed through an autoclave or a tube, where it is heated up to 250-300° C., when the polymerization starts, although some of the heat is removed by cooling. The pressure, temperature and starter type are all variables which influence the properties of the polyethylene in a manner such as is known to persons skilled in the art. Free radical starters which can be used are all the known free radical starters which are known to the person skilled in the art for starting the polymerization of ethylene to give polyethylene. Any compound which contains one or more atoms or atom groups which can be transferred as free radicals under the polymerization conditions of the autoclave or tube process can be employed as the starter, or also called initiator. The preferred initiators include benzyl halides, such as p-chloromethylstyrene, benzyl chloride, benzyl bromide, 1-bromo-1-phenylethane and 1-chloro-1-phenylethane. Carboxylic acid derivatives, for example propyl 2-bromopropionate, methyl 2-chloropropionate, ethyl 2-chloropropionate, methyl 2-bromopropionate or ethyl 2-bromoisobutyrate, are furthermore particularly preferred. Tosyl halides, such as p-toluenesulphonyl chloride; alkyl halides, such as carbon tetrachloride, tribromoethane, 1-vinylethyl chloride or 1-vinylethyl bromide; and halogen derivatives of phosphoric acid esters, such as demethylphosphonic acid chloride, are also preferred. In a preferred embodiment of the invention, peroxides or oxygen or both are employed as starters.

The differentiation between LDPEa and LDPEt is preferably made by their damping properties. The damping properties, specifically the damping factor δ, at various frequencies of a rotary rheometer can be determined with the aid of test specimens of the particular material. Details of this determination are to be found under the test methods.

According to the invention, the damping factor differences of the constituents of the first PE blend layer are in a range of from −0.3 to −0.6, preferably in a range of from −0.31 to −0.55, particularly preferably in a range of from −0.32 to −0.52.

The damping factor differences of LDPEa and LDPEt are furthermore preferably in different ranges. Thus it is preferable for the damping factor difference of the LDPEa to be in a range of from −0.30 to below −0.40, while the damping factor difference of LDPEt is in a range of from −0.40 to −0.60, preferably in a range of from −0.41 to −0.55, particularly preferably in a range of from −0.42 to −0.52.

Surprisingly, it has now been found that by mixing, that is to say formation of a blend, of the two LDPEs, that is to say the LDPEa and the LDPEt, various properties of the blend formed do not result in the expected average of the properties of the individual constituents. This is found above all for the damping properties, but also for the flow properties during extrusion of the blend. Thus it is preferable, for example, to use in the extrusion process polymers which have a low "neck-in" value. The neck-in value indicates how severely the polymer film constricts between the die opening and the substrate to be coated. The neck-in value is calculated from the difference between the die width and the film width on the substrate.

Preferably, the neck-in value is less than 40 mm, particularly preferably less than 35 mm, very particularly preferably less than 30 mm. More precise information on the determination of the neck-in value is to be found in the test methods and examples.

A further indication of the unexpected properties of the mixtures of LDPEa and LDPEt in the stated ranges is the improved "draw-down ratio". The draw-down ratio, DDR for short, is to be understood as meaning the greatest acceleration of the molten polymer film, of the extruded polymer, between the die opening and the substrate to be coated before the film tears. The DDR is calculated from the ratio of the die lip and the thickness of the film. The higher the DDR value, the more quickly a plastic can be extruded and coated on a substrate in a stable manner. More precise information on the determination of the draw-down ratio is to be found in the test methods and examples.

Due to these particular properties of the mixtures of LDPEa and LDPEt, extrusion speeds of from 1 to 20 m/sec, preferably from 2 to 10 m/sec can be achieved.

In a preferred embodiment of the planar composite, an additional blend layer is provided between the carrier layer and the barrier layer. Preferably, the additional blend layer comprises a PE blend layer. Particularly preferably, the additional blend layer comprises a first LDPEa in a range of from 10 to 50 wt. %, in each case based on the blend; and a further LDPEt to the extent of at least 50 wt. %, in each case based on the blend. Preferably, the additional PE blend layer has a damping factor difference in a range of from −0.3 to −0.6. Preferably, in connection with the additional PE blend layer this is provided with the first and the further PE blend layer in a planar composite according to the invention. The layer sequence comprising PE blend layer, followed by the carrier layer, followed by PE blend layer, followed by the barrier layer, followed by PE blend layer is preferred here according to the invention.

According to the invention, the planar composite comprises at least one first PE blend layer and a further PE blend layer, wherein these each preferably have a weight per unit area in a range of from 5 to 50 g/m², particularly preferably in a range of from 8 to 40 g/m² and most preferably in a range of from 10 to 30 g/m². Preferably, the first PE blend layer comprises in a range of from 10 wt. % to 50 wt. %, preferably in a range of from 20 wt. % to 40 wt. %, in each case based on the blend, an LDPEa. The first PE blend layer furthermore preferably comprises a further LDPEt to the extent of at least 50 wt. %, preferably to the extent of at least 60 wt. %, particularly preferably to the extent of at least 70 wt. %, based on the blend.

A planar composite wherein the first LDPEa has a damping factor difference of greater than −0.4; and wherein the further LDPEt has a damping factor difference of less than −0.4 is furthermore preferred.

As the carrier layer, any material which is suitable for this purpose to the person skilled in the art and which has an adequate strength and rigidity to give the container stability to the extent that in the filled state the container essentially retains its shape can be employed. In addition to a number of plastics, plant-based fibrous substances, in particular celluloses, preferably sized, bleached and/or non-bleached celluloses, are preferred, paper and cardboard being particularly preferred.

In a preferred embodiment of the planar composite, the carrier layer comprises a cardboard.

The weight per unit area of the carrier layer is preferably in a range of from 120 to 450 g/m², particularly preferably in a range of from 130 to 400 g/m² and most preferably in a range of from 150 to 380 g/m². A preferred cardboard as a rule has a single- or multilayer construction and can be coated on one or both sides with one or also more covering layers. A preferred cardboard furthermore has a residual moisture content of less than 20 wt. %, preferably from 2 to 15 wt. % and particularly preferably from 4 to 10 wt. %, based on the total weight of the cardboard. A particularly preferred cardboard has a multilayer construction. The cardboard furthermore preferably has at least one, but particularly preferably at least two layers of a covering layer, which is known to the person skilled in the art as "coating", on the surface facing the environment. In papermaking, liquid phases comprising inorganic solid particles, preferably solutions containing chalk, gypsum or clay, which are applied to the surface of the cardboard are usually called a "coating". A preferred cardboard furthermore preferably has a Scott bond value in a range of from 100 to 360 J/m², preferably from 120 to 350 J/m² and particularly preferably from 135 to 310 J/m². Due to the abovementioned ranges, it is possible to provide a composite from which a container of high leakproofness can be folded easily and in low tolerances.

Suitable polyethylenes of the first or the further PE blend layer have a melt flow rate (MFR) in a range of from 1 to 25 g/10 min, preferably in a range of from 2 to 20 g/10 min and particularly preferably in a range of from 2.5 to 15 g/10 min, and a density in a range of from 0.910 g/cm³ to 0.935 g/cm³, preferably in a range of from 0.912 g/cm³ to 0.932 g/cm³, and further preferably in a range of from 0.915 g/cm³ to 0.930 g/cm³. The first PE blend layer, preferably all the PE blend layers contained in the planar composite, preferably has a melting temperature in a range of from 80 to 155° C., preferably in a range of from 90 to 145° C. and particularly preferably in a range of from 95 to 135° C.

In a preferred embodiment of the planar composite, the first LDPEa or the further LDPEt has a mass density in a range of from 0.915 g/cm³ to 0.940 g/cm³.

As the barrier layer, any material which is suitable for this purpose to the person skilled in the art and has an adequate barrier action, in particular against oxygen, can be employed. The barrier layer is preferably chosen from a. a barrier layer of plastic;
b. a metal layer;
c. a metal oxide layer; or
d. a combination of at least two of a. to c.

If the barrier layer according to alternative a. is a barrier layer of plastic, this preferably comprises at least 70 wt. %, particularly preferably at least 80 wt. % and most preferably at least 95 wt. % of at least one plastic which is known to the person skilled in the art for this purpose, in particular because of aroma or gas barrier properties which are suitable for packaging containers. Possible plastics, in particular thermoplastics, here are plastics carrying N or O, both by themselves and in mixtures of two or more. According to the invention, it may prove advantageous if the barrier layer of plastic has a melting temperature in a range of from more than 155 to 300° C., preferably in a range of from 160 to 280° C. and particularly preferably in a range of from 170 to 270° C.

Further preferably, the barrier layer of plastic has a weight per unit area in a range of from 2 to 120 g/m², preferably in a range of from 3 to 60 g/m², particularly preferably in a range of from 4 to 40 g/m² and moreover preferably from 6 to 30 g/m². Furthermore preferably, the barrier layer of plastic is obtainable from melts, for example by extrusion, in particular laminating extrusion. Moreover preferably, the barrier layer of plastic can also be introduced into the planar composite via lamination. It is preferable here for a film to be incorporated into the planar composite. According to another embodiment, barrier layers of plastic which are obtainable by deposition from a solution or dispersion of plastics can also be chosen.

Possible suitable polymers are preferably those which have a weight-average molecular weight, determined by gel permeation chromatography (GPC) by means of light scattering, in a range of from $3 \times 10^3$ to $1 \times 10^7$ g/mol, preferably in a range of from $5 \times 10^3$ to $1 \times 10^6$ g/mol and particularly preferably in a range of from $6 \times 10^3$ to $1 \times 10^5$ g/mol. Possible suitable polymers are, in particular, polyamide (PA) or polyethylene/vinyl alcohol (EVOH) or a mixture thereof.

Among the polyamides, all PAs which seem suitable for the use according to the invention to the person skilled in the art are possible. PA 6, PA 6.6, PA 6.10, PA 6.12, PA 11 or PA 12 or a mixture of at least two of these are to be mentioned here in particular, PA 6 and PA 6.6 being particularly preferred and PA 6 being further preferred. PA 6 is commercially obtainable, for example, under the trade names Akulon®, Durethan® and Ultramid®. Amorphous polyamides, such as e.g. MXD6, Grivory® and Selar® PA, are moreover suitable. It is further preferable for the PA to have a density in a range of from 1.01 to 1.40 g/cm³, preferably in a range of from 1.05 to 1.30 g/cm³ and particularly preferably in a range of from 1.08 to 1.25 g/cm³. Furthermore, it is preferable for the PA to have a viscosity number in a range of from 130 to 185 ml/g and preferably in a range of from 140 to 180 ml/g.

As EVOH, all EVOHs which seem suitable for the use according to the invention to the person skilled in the art are possible. Examples of these are, inter alia, commercially obtainable in a large number of different configurations under the trade name EVAL™ from EVAL Europe NV, Belgium, for example the types EVAL™ F104B or EVAL™ LR171B. Preferred EVOHs have at least one, two, several or all of the following properties:

an ethylene content in a range of from 20 to 60 mol %, preferably from 25 to 45 mol %;

a density in a range of from 1.0 to 1.4 g/cm³, preferably from 1.1 to 1.3 g/cm³;

a melting point in a range of from more than 155 to 235° C., preferably from 165 to 225° C.;

an MFR value (210° C./2.16 kg if $T_{M(EVOH)}$<230° C.; 230° C./2.16 kg if 210° C.<$T_{M(EVOH)}$<230° C.) in a range of from 1 to 25 g/10 min, preferably from 2 to 20 g/10 min;

an oxygen permeation rate in a range of from 0.05 to 3.2 cm³·20 μm/m²·day·atm, preferably in a range of from 0.1 to 1 cm³·20 μm/m²·day·atm.

According to alternative b. the barrier layer is a metal layer. All layers with metals which are known to the person skilled in the art and can provide a high impermeability to light and oxygen are suitable in principle as the metal layer. According to a preferred embodiment, the metal layer can be present as a foil or as a deposited layer, e.g. formed by a physical gas phase deposition. The metal layer is preferably an uninterrupted layer. According to a further preferred embodiment, the metal layer has a thickness in a range of from 3 to 20 μm, preferably a range of from 3.5 to 12 μm and particularly preferably in a range of from 4 to 10 μm.

Metals which are preferably chosen are aluminium, iron or copper. A steel layer, e.g. in the form of a foil, may be preferred as an iron layer. Furthermore preferably, the metal layer is a layer with aluminium. The aluminium layer can expediently be made of an aluminium alloy, for example AlFeMn, AlFe1.5Mn, AlFeSi or AlFeSiMn. The purity is conventionally 97.5% and higher, preferably 98.5% and higher, in each case based on the total aluminium layer. In a particular embodiment, the metal layer is made of an aluminium foil. Suitable aluminium foils have an extensibility of more than 1%, preferably of more than 1.3% and particularly preferably of more than 1.5%, and a tensile strength of more than 30 N/mm², preferably more than 40 N/mm² and particularly preferably more than 50 N/mm². Suitable aluminium foils show a drop size of more than 3 mm, preferably more than 4 mm and particularly preferably of more than 5 mm in the pipette test. Suitable alloys for establishing aluminium layers or foils are commercially obtainable under the designations EN AW 1200, EN AW 8079 or EN AW 8111 from Hydro Aluminium Deutschland GmbH or Amcor Flexibles Singen GmbH.

In the case of a metal foil as the barrier layer, an adhesion promoter layer can be provided between the metal foil and the next PE blend layer on one and/or both sides of the metal foil. According to a particular embodiment of the container according to the invention, however, an adhesion promoter is provided between the metal foil and the next PE blend layer on no side of the metal foil.

Furthermore preferably, a metal oxide layer can be chosen as the barrier layer according to alternative c. Possible metal oxide layers are all metal oxide layers which are familiar and seem suitable to the person skilled in the art for achieving a barrier action against light, vapour and/or gas. Metal oxide layers based on the metals aluminium, iron or copper already mentioned above and those metal oxide layers based on titanium or silicon oxide compounds are preferred in particular. A metal oxide layer is produced, by way of example, by vapour deposition of a metal oxide on a layer of plastic, for example an orientated polypropylene film. A preferred process for this is physical gas phase deposition.

According to a further preferred embodiment, the metal layer or metal oxide layer can be present as a laminated composite of one or more layers of plastic with a metal layer. Such a layer is obtainable, for example, by vapour deposition of a metal on a layer of plastic, for example an orientated polypropylene film. A preferred process for this is physical gas phase deposition.

In order to facilitate the ease of opening of the container according to the invention or of the planar composite, the carrier layer can have at least one hole. In a particular embodiment, the hole is covered at least with the barrier layer and at least the first PE blend layer as a hole-covering layer.

A planar composite wherein the carrier layer has at least one hole which is covered at least with the barrier layer and at least with the first PE blend layer, the further PE blend layer or the additional blend layer or a combination of at least two of these as a hole-covering layer is preferred.

According to a further preferred embodiment, the carrier layer of the composite has a hole which is covered at least with the first PE blend layer, the barrier layer and the further PE blend layer as hole-covering layers. It is particularly preferable for the hole additionally to be covered with the further PE blend layer. One or more further layers, in particular adhesion promoter layers, can furthermore be provided between the layers already mentioned. It is preferable here for the hole-covering layers to be joined to one another at least partly, preferably to the extent of at least 30%, preferably at least 70% and particularly preferably to the extent of at least 90% of the area formed by the hole. According to a particular embodiment, it is preferable for the hole to penetrate through the entire composite and to be covered by a closure or opening device which closes the hole.

In connection with a first preferred embodiment, the hole provided in the carrier layer can have any form which is known to the person skilled in the art and is suitable for various closures, drinking straws or opening aids.

The opening of a planar composite or of a container having a planar composite is usually generated by at least partial destruction of the hole-covering layers covering the hole. This destruction can be effected by cutting, pressing into the container or pulling out of the container. The destruction can be effected by an openable closure joined to the container and arranged in the region of the hole, usually above the hole, or a drinking straw which is pushed through the hole-covering layers covering the hole.

According to a further preferred embodiment, the carrier layer of the composite has a plurality of holes in the form of a perforation, the individual holes being covered at least with the barrier layer and the first PE blend layer as the hole-covering layer. A container produced from such a composite can then be opened by tearing along the perforation. Such holes for perforations are preferably generated by means of a laser. The use of laser beams is particularly preferred if a metal foil or a metallized film is employed as the barrier layer. It is furthermore possible for the perforation to be introduced by mechanical perforation tools, usually having blades.

According to a further preferred embodiment, the planar composite is subjected to a heat treatment at least in the region of the at least one hole. In the case of several holes present in the carrier layer in the form of a perforation, it is particularly preferable for this heat treatment also to be carried out around the edge region of the hole.

The heat treatment can be carried out by radiation, by hot gas, by thermal contact with a solid, by mechanical vibrations or by a combination of at least two of these measures. Particularly preferably, the heat treatment is carried out by irradiation, preferably electromagnetic radiation and particularly preferably electromagnetic induction or also by hot gas. The particular optimum operating parameters to be chosen are known to the person skilled in the art.

Possible adhesion promoters in the adhesion promoter layer are all plastics which, due to functionalization by means of suitable functional groups, are suitable for generating a firm join by the formation of ionic bonds or covalent bonds to the surface of the other particular layer. Preferably, these are functionalized polyolefins which have been obtained by copolymerization of ethylene with acrylic acids, such as acrylic acid, methacrylic acid, crotonic acid, acrylates, acrylate derivatives or carboxylic acid anhydrides carrying double bonds, for example maleic anhydride, or at least two of these. Among these, polyethylene-maleic anhydride graft polymers (EMAH), ethylene/acrylic acid copolymers (EAA) or ethylene/methacrylic acid copolymers (EMAA), which are marketed, for example, under the trade names Bynel® and Nucrel® 0609HSA by DuPont or Escor®6000ExCo by ExxonMobil Chemicals, are preferred.

According to the invention, it is preferable for the adhesion between the carrier layer, the first PE blend layer, the further PE blend layer or the barrier layer, preferably at least two of these, and the particular next layer to be at least 0.5 N/15 mm, preferably at least 0.7 N/15 mm and particularly preferably at least 0.8 N/15 mm. In one embodiment according to the invention, it is preferable for the adhesion between the first PE blend layer or the further PE blend layer and the carrier layer to be at least 0.3 N/15 mm, preferably at least 0.5 N/15 mm and particularly preferably at least 0.7 N/15 mm. It is furthermore preferable for the adhesion between the barrier layer and the layers adjacent to the barrier layer in the case of the directly following first and/or further PE blend layer to be at least 0.8 N/15 mm, preferably at least 1.0 N/15 mm and particularly preferably at least 1.4 N/15 mm. In the case where the barrier layer indirectly follows the next layers of the planar composite via adhesion promoter layers, it is preferable for the adhesion between the barrier layer and the adhesion promoter layer to be at least 1.8 N/15 mm, preferably at least 2.2 N/15 mm and particularly preferably at least 2.8 N/15 mm. In a particular embodiment of the planar composite, the adhesion between the individual layers is so strong in configuration that in the adhesion test tearing of the carrier layer, and in the case of a cardboard as the carrier layer a so-called tearing of the cardboard fibre, occurs.

In one embodiment of the process according to the invention, it is preferable, for further improvement in the adhesion of two adjacent layers to one another, for these to be subjected to a surface treatment, for example, during the coating. Suitable processes for the surface treatment are a flame treatment, a treatment with plasma, a corona treatment or a treatment with ozone known, inter alia, to the person skilled in the art However, other processes which have the effect of formation of functional groups on the surface of the treated layer are also conceivable. In a particular embodiment, at least one of these processes is used in the lamination of metal layers, in particular of metal foils.

According to a further preferred embodiment of the composite according to the invention, the planar composite according to the invention has at least a third PE layer, particularly preferably a third PE blend layer, wherein the third PE blend layer preferably lies between the layer ii. and the layer iii. In a particular embodiment, the third PE layer follows the carrier layer, and preferably follows indirectly, for example via an adhesion promoter layer. In another embodiment, more than one further layer, in particular the further PE blend layer, is provided between the carrier layer and the third PE layer. If the composite according to the invention has no third PE blend layer, the further PE blend layer follows the barrier layer, preferably indirectly, for example via an adhesion promoter layer. In another embodiment example, in the absence of the third PE layer, also no further layer, in particular no adhesion promoter layer, is provided between the further PE blend layer and the barrier layer. It is preferable for an adhesion promoter layer to be introduced in each case between the barrier layer and the PE layers following on both sides, in particular the first PE blend layer and the further PE blend layer.

The third PE layer, in particular the third PE blend layer, preferably has a weight per unit area in a range of from 5 to 50 g/m², particularly preferably from 8 to 40 g/m² and moreover preferably from 10 to 30 g/m². The plastics which have already been described above for the first or further PE blend layer, in particular, can in turn preferably be employed.

According to a further preferred embodiment variant, one or more or all of the PE blend layers of the composite can also comprise an inorganic solid as a filler, in addition to a polyethylene. All solids which seem suitable to the person skilled in the art are possible as the inorganic solid, preferably particulate solids, preferably metal salts or oxides of di- to tetravalent metals. Examples which may be mentioned here are the sulphates or carbonates of calcium, barium or magnesium or titanium dioxide, preferably calcium carbonate. The average particle sizes (d50%) of the inorganic solids, determined by sieve analysis, are preferably in a range of from 0.1 to 10 μm, preferably in a range of from 0.5 to 5 μm and particularly preferably in a range of from 1 to 3 μm.

A further contribution towards achieving at least one object of the present invention is made by a process for the production of the planar composite described above. All the processes which are known to the person skilled in the art and seem suitable for the production of the composite according to the invention are possible for this. All aspects and features of the planar composite can also be applied to the process and vice versa.

The invention provides a process for the production of a planar composite, wherein the planar composite comprises a carrier layer and a barrier layer, comprising the steps:
S1. provision of a first LDPEa and a further LDPEt;
  wherein the first LDPEa has a damping factor difference of greater than −0.4; and
  wherein the further LDPEt has a damping factor difference of less than −0.4;
S2. mixing of the first LDPEa and the further LDPEt to give a PE blend, wherein the PE blend comprises in a range of from 10 to 50 wt. %, in each case based on the blend, the first LDPEa; and
  the further LDPEt to the extent of at least 50 wt. %, in each case based on the PE blend;
S3. application of the PE blend to a composite precursor, wherein the composite precursor comprises a carrier layer.

In process step S1. of the process according to the invention, a first LDPEa and a further LDPEt are provided, as has already been described above for the planar composite. In this context, the LDPEa has a damping factor difference of greater than −0.4, while the LDPEt has a damping factor difference of less than −0.4. All further features of the first LDPEa and the further LDPEt can be seen from the properties stated for the planar composite.

In a second step S2., mixing of the first LDPEa and the further LDPEt to give a blend is carried out, wherein the PE blend comprises in a range of from 10 to 50 wt. %, preferably in a range of from 10 to 40 wt. %, in each case based on the PE blend, the first LDPEa, and comprises the further LDPEt to the extent of at least 50 wt. %, preferably in a range of from 50 wt. % to 90 wt. %, particularly preferably in a range of from 60 to 80 wt. %, based on the PE blend. In a third step S3., the PE blend from step 2. is applied to a composite precursor, wherein the composite precursor comprises a carrier layer.

The composite precursor preferably comprises the carrier layer, which can already have one or more holes. At least one printed layer can furthermore optionally be applied to the carrier layer. Preferably, however, this composite precursor is a non-printed carrier layer.

The application of this at least one PE blend layer is preferably carried out by melt coating, preferably by extrusion coating. However, it is also conceivable for several layers, for example further layers of plastic, barrier layers and/or adhesion promoter layers, to be applied sequentially or simultaneously by coextrusion in step S3.

In step S3. at least one further PE blend layer can be simultaneously or subsequently applied to the opposite side of the composite precursor. The application of this at least one further PE blend layer is preferably carried out by melt coating, preferably by extrusion coating. However, it is also conceivable for several layers, for example layers of plastic, barrier layers and/or adhesion promoter layers, to be applied sequentially or simultaneously by coextrusion in step S3.

During application of the individual layers, in a preferred embodiment the at least one film or a multilayer composite film is provided in the form of a roll and is laminated on to the composite via further layers, preferably layers of plastic, preferably PE layers, particularly preferably PE blend layers, or adhesion promoter layers. This is also the case in particular during introduction of metal layers, in particular of metal foils.

If the planar composite has one or more holes to facilitate ease of opening, these can be introduced into the composite precursor or the planar composite either before or after step S1., after step S2. or after step S3.

In a preferred embodiment of the process, a non-printed carrier layer which already has holes is provided as the composite precursor in step S3. In step S3. the PE blend is then first applied to the composite precursor. In the further process step S3., the optional further PE blend layer, the barrier layer and optionally a third PE layer, preferably a third PE blend layer, are then applied. In each case one or more adhesion promoter layers can also be co-applied here. In another embodiment, however, it is also conceivable that in step S3. first the PE blend layer, the barrier layer and optionally the further PE blend layer are applied. Here also, in each case further layers, for example adhesion promoter layers, can be co-applied. The extrusion can be carried out in individual layers by a series of successive individual extruders or also in multiple layers by coextrusion, the abovementioned sequence of the individual layers always being retained. A combination of extrusion and lamination coating can also take place in the process according to the invention.

In connection with the planar composite, but also in connection with the composite precursor, it is preferable for at least one of the two to have at least one or two and more scores along which edges are formed during production of the container. This facilitates the folding and the formation of a crease running along the line prepared by the score, in order to achieve in this way a fold which is as uniform and accurately positioned as possible. The scores can be introduced already before step S1., after step S2. or also after step S3., it being preferable for the scoring to be carried out after step S3., that is to say after the coating of the both sides of the carrier layer.

As a rule, the planar composite is produced, usually as roll goods, by coextrusion of the individual layers of the planar composite. The scores are provided on these roll goods. However, it is also possible for the scores to be produced in the carrier layer already before the coating.

The two constituents of the PE blend, the LDPEa and the LDPEt, can be preheated together or separately here and then melted. Preferably, the first LDPEa and the LDPEt are each present as granules or powder. The preheating is preferably carried out at a temperature in a range of from 30 to 100° C., preferably in a range of from 40 to 90° C. The first LDPEa and the further LDPEt can then either be further melted separately, which takes place at a temperature in a range of from 130 to 150° C., or they can already be mixed before the melting.

In another embodiment of the process according to the invention, the constituents of the PE blend are first mixed in a temperature range of from 10 to 60° C. and the mixture obtained in this way is then melted, this preferably being carried out in an extruder.

The process wherein the mixing in step 2. is carried out in the melt is preferred. Preferably, the first LDPEa and the LDPEt are each present as granules or powder, which are first each brought to a temperature in a range of from 130 to 150° C., preferably in a range of from 130 to 140° C. The two melts are then brought together and mixed in an extruder. During the extrusion, the thermoplastics are conventionally heated to temperatures of from 210 to 330° C., measured on the molten polymer film below the exit at the extruder die. The extrusion can be carried out by means of extrusion tools which are known to the person skilled in the art and commercially obtainable, such as, for example, extruders, extruder screws, feed block etc.

At the end of the extruder, there is preferably an opening, through which the PE blend is pressed. The opening can have any form which allows the PE blend to be extruded on to the composite precursor. The opening can thus be, for example, angular, oval or round. The opening preferably has the form of a slot of a hopper. In a preferred embodiment of the process, the application is carried out through a slot. The slot preferably has a length in a range of from 0.1 to 100 m, preferably in a range of from 0.5 to 50 m, particularly preferably in a range of from 1 to 10 m. The slot furthermore preferably has a width in a range of from 0.1 to 20 mm, preferably in a range of from 0.3 to 10 mm, particularly preferably in a range of from 0.5 to 5 mm.

During the application of the PE blend in step S3. it is preferable for the slot and the composite precursor to move relative to one another. A process wherein the composite precursor moves relative to the slot is thus preferred.

According to a further preferred embodiment of the process according to the invention for the production of a planar composite, in particular the carrier layer, as described above, includes a hole or several holes. It is furthermore preferable for at least one of the PE blends to be stretched during the application, this stretching preferably being carried out by melt stretching, very particularly preferably by monoaxial melt stretching. For this, the layer is applied in the molten state to the composite precursor by means of a melt extruder and the layer applied, which is still in the molten state, is then stretched in preferably the monoaxial direction in order to achieve an orientation of the polymer in this direction. The layer applied is then allowed to cool for the purpose of thermofixing.

In this connection, it is particularly preferable for the stretching to be carried out by at least the following application steps:

b1. emergence of the at least first PE blend as at least one melt film via at least one extruder die slot with an exit speed $V_{exit}$;

b2. application of the at least one melt film to the composite precursor moving relative to the at least one extruder die slot with a moving speed $V_{adv}$;

where $V_{exit} < V_{adv}$. It is particularly preferable for $V_{adv}$ to be greater than $V_{exit}$ by a factor in the range of from 5 to 200, particularly preferably in a range of from 7 to 150, moreover preferably in a range of from 10 to 50 and most preferably in a range of from 15 to 35. In this context, it is preferable for $V_{adv}$ to be at least 100 m/min, particularly preferably at least 200 m/min and very particularly preferably at least 350 m/min, but conventionally not to lie above 1,300 m/min.

After the melt layer has been applied to the composite precursor by means of the stretching process described above, the melt layer is allowed to cool for the purpose of thermofixing, this cooling preferably being carried out by quenching via contact with a surface which is kept at a temperature in a range of from 5 to 50° C., particularly preferably in a range of from 10 to 30° C.

As already described above, after the thermofixing it may prove to be particularly advantageous if the planar composite is heat-treated at least in the region of the at least one hole, in order to effect there an at least partial elimination of the orientation of the polymer.

According to a further preferred embodiment, at least one, preferably at least two or even all the PE blends are produced by extrusion or coextrusion of at least one polymer P1 through a slot die to obtain an emerging area, often also as a melt film/slip. At least one neck-in region can form on the flanks (see FIG. 7a).

According to a further preferred embodiment, the area which has emerged is cooled to a temperature below the lowest melting temperature of the polymers provided in this area or its flanks, and at least the flanks of the area are then separated off from this area. Cooling can be carried out in any manner which is familiar to the person skilled in the art and seems to be suitable. The thermofixing already described above is also preferred here. At least the flanks are then separated off from the area F. The separating off can be carried out in any manner which is familiar to the person skilled in the art and seems to be suitable. Preferably, the separating off is carried out by a knife, laser beam or water jet, or a combination of two or more of these, the use of knives, in particular knives for a shear cut, being particularly preferred.

A further contribution towards achieving at least one object of the present invention is made by a planar composite obtainable by the process described above.

A further contribution towards achieving at least one object of the present invention is made by a container which surrounds an interior and comprises at least the planar composite described above. The embodiments, and in particular the preferred embodiments, described in connection with the planar composite according to the invention are also preferred for the container according to the invention.

A further contribution towards achieving at least one object of the present invention is made by a process for the production of a container which surrounds an interior and comprises at least the planar composite described above. The embodiments, and in particular the preferred embodiments, described in connection with the planar composite according to the invention are also preferred for the process for the production of the container.

A further contribution towards achieving at least one object of the present invention is made by a process for the production of a container which surrounds an interior, comprising the steps a. provision of a planar composite according to the invention;
b. folding of the planar composite to form a fold having at least two fold surfaces adjacent to one another, wherein the further PE layer faces the interior of the container;
c. joining in each case at least a part region of the at least two fold surfaces to form a container region;
d. closing of the folded, planar composite with a closing tool.

In connection with the process according to the invention, it is preferable for the folding in step b. to be carried out in a temperature range of from 10 to 50° C., preferably in a range of from 15 to 45° C. and particularly preferably in a range of from 20 to 40° C. This can be achieved by the planar composite having a temperature in the above ranges. It is furthermore preferable for the folding tool, preferably together with the planar composite, to have a temperature in the above range. For this, the folding tool has no heating. Rather, the folding tool or also the planar composite or both can be cooled. It is furthermore preferable for the folding to be carried out at a temperature of at most 50° C. as "cold folding" and for the joining in step c. to be carried out at above 50° C., preferably above 80° C. and particularly preferably above 120° C. as "heat sealing". The above conditions and in particular temperatures preferably also apply in the surroundings of the fold, for example in the housing of the folding tool. In a further embodiment of the process according to the invention, it is preferable for the cold folding or the cold folding in combination with the heat sealing to be applied at angles μ which form during folding of less than 100°, preferably less than 90°, particularly preferably less than 70° and moreover preferably less than 50°. The angle μ is formed by two adjacent fold surfaces and is illustrated in FIGS. 4a and 4b and 5a and 5b.

The process wherein the joining according to step c. is carried out by irradiation, contact with a hot solid, by mechanical vibration or hot gas or a combination of at least two of these is preferred.

The process wherein the container is filled with a foodstuff before step b. or after step c. is preferred.

The process wherein the planar composite has at least one score and the folding takes place along the score is furthermore preferred.

The plastics employed for the further layers of plastic, such as the third PE layer, comprise a single thermoplastic or two or more thermoplastics. The above statements regarding the thermoplastics and the layers of thermoplastic therefore apply here accordingly. Generally, the plastics compositions can be fed to an extruder in any form which the person skilled in the art deems suitable for extruding. Preferably, the plastics compositions are employed as powder or granules, preferably as granules.

If the roll goods provided with scores are not employed directly in step a., container blanks for an individual container are obtained from the roll goods and are provided as the planar composite in step a.

In process step a. of the process according to the invention, a planar composite obtained by the process described above for the production of a planar composite is first provided, from which a container precursor is then formed by folding in process step b.

According to a further preferred embodiment of the process according to the invention, at least on PE blend layer, further preferably at least the first PE blend layer, or also all the PE blend layers has or have a melting temperature below the melting temperature of the barrier layer. This applies in particular if the barrier layer is formed from a polymer.

The melting temperatures of the at least one, preferably of the at least two PE blend layers and the melting temperature of the barrier layer preferably differ here by at least 1 K, particularly preferably by at least 10 K, still more preferably by at least 50 K, moreover preferably at least 100 K. The temperature difference should preferably be chosen only high enough so that no melting of the barrier layer, in particular no melting of the barrier layer of plastic, occurs during the folding.

According to the invention, in this context "folding" is understood as meaning an operation in which preferably an elongated crease forming an angle is generated in the folded planar composite by means of a folding edge of a folding tool. For this, two adjacent surfaces of a planar composite are often bent ever more towards one another. By the fold, at least two adjacent fold surfaces are formed, which can then be joined at least in part regions to form a container region. According to the invention, the joining can be effected by any measure which appears to be suitable to the person skilled in the art and which renders possible a join which is as gas- and liquid-tight as possible. The joining can be carried out by sealing or gluing or a combination of the two measures. In the case of sealing, the join is created by means of a liquid and solidification thereof. In the case of gluing, chemical bonds which create the join form between the boundary faces or surfaces of the two objects to be joined. In the case of sealing or gluing, it is often advantageous for the surfaces to be sealed or glued to be pressed together with one another.

The sealing temperature is preferably chosen such that the thermoplastic(s) involved in the sealing, preferably the polymers of the PE blend layers, are present as a melt. The sealing temperatures are therefore at least 1 K, preferably at least 5 K and particularly preferably at least 10 K above the melting temperature of the particular plastic. Furthermore, the sealing temperature chosen should not be too high, in order that the exposure of the plastic(s) to heat is not unnecessarily severe, so that these do not lose their envisaged material properties.

In a further preferred embodiment of the process according to the invention, it is envisaged that the container is filled with a foodstuff before step b. or after step c. All the foodstuffs for human consumption and also animal feeds known to the person skilled in the art are possible as the foodstuff. Preferred foodstuffs are liquid above 5° C., for example dairy products, soups, sauces and non-carbonated drinks. The filling can be carried out in various ways. On the one hand, the foodstuff and the container can be sterilized separately, before the filling, to the greatest degree possible by suitable measures such as treatment of the container with $H_2O_2$, UV radiation or other suitable high-energy radiation, plasma treatment or a combination of at least two of these, as well as heating of the foodstuff, and the container is then filled. This type of filling is often called "aseptic filling" and is preferred according to the invention. In addition to or also instead of the aseptic filling, it is furthermore a widespread procedure to heat the container filled with foodstuff to reduce the germ count. This is preferably carried out by pasteurization or autoclaving. Less sterile foodstuffs and containers can also be employed in this procedure.

In the embodiment of the process according to the invention in which the container is filled with foodstuff before step b., it is preferable for a tubular structure with a fixed longitudinal seam first to be formed from the planar composite by sealing or gluing the overlapping borders. This tubular structure is compressed laterally, fixed and separated and formed into an open container by folding and sealing or gluing. The foodstuff here can already be filled into the container before the fixing and before the separation and folding of the base in the sense of step b.

In the embodiment of the process according to the invention in which the container is filled with foodstuff after step c., it is preferable for a container which is obtained by shaping the planar composite and is opened on one side to be employed. Shaping of the planar composite and obtaining of a container opened in which way can be carried out by steps b. and c. by any procedure which appears to be suitable for this to the person skilled in the art. In particular, shaping can be carried out by a procedure in which sheet-like container blanks which already take into account the shape of the container in their cut-out are folded such that an opened container precursor is formed. This is as a rule effected by a procedure in which after folding of this container blank, its longitudinal edges are sealed or glued to form a side wall and the one side of the container precursor is closed by folding and further fixing, in particular sealing or gluing.

In a further embodiment of the process according to the invention, it is preferable for the fold surfaces to form an angle μ of less than 90°, preferably of less than 45° and particularly preferably of less than 20°. The fold surfaces are often folded to the extent that these come to lie on one another at the end of the folding. This is advantageous in particular if the fold surfaces lying on one another are subsequently joined to one another in order to form the container base and the container top, which is often configured gable-like or also flat. Regarding the gable configuration, reference may be made by way of example to WO 90/09926 A2.

Furthermore, in one embodiment of the process according to the invention, at least one of the PE blend layers, preferably at least the first PE blend layer, or also all the PE blend layers is or are heated above the melting temperature of the particular PE blend layer before step c. Preferably, before step c., particularly preferably directly before step c., heating is carried out to temperatures which are at least 1 K, preferably at least 5 K and particularly preferably at least 10 K above the melting temperature of these layers. The temperature should as far as possible be above the melting temperature of the particular plastic to the extent that by the cooling, due to the folding, moving and pressing, the plastic does not cool to the extent that this becomes solid again.

Preferably, the heating to these temperatures is carried out by irradiation, by mechanical vibrations, by contact with a hot solid or hot gas, preferably hot air, or a combination of these measures. In the case of irradiation, any type of radiation which is suitable to the person skilled in the art for softening the plastics is possible. Preferred types of radiation are IR rays, UV rays, microwaves or also electromagnetic radiation, in particular electromagnetic induction. Preferred types of vibration are ultrasound.

The invention also provides a container obtainable by the process described above.

The container according to the invention can have a large number of different forms, but an essentially square-shaped structure is preferred. The container can furthermore be formed over its complete surface from the planar composite, or can have a 2- or multi-part structure. In the case of a multi-part structure, it is conceivable that in addition to the planar composite, other materials can also be employed, for example plastic material, which can be employed in particular in the top or the base regions of the container. However, it is preferable here for the container to be constructed from the planar composite to the extent of at least 50%, particularly preferably to the extent of at least 70% and moreover preferably to the extent of at least 90% of the surface. Furthermore, the container can have a device for emptying the contents. This can be formed, for example, from plastic material and attached to the outside of the container. It is also conceivable that this device is integrated into the container by "direct injection moulding".

According to a preferred embodiment, the container according to the invention has at least one, preferably from 4 to 22 or also more edges, particularly preferably from 7 to 12 edges. In the context of the present invention, edge is understood as meaning regions which are formed on folding a surface. Edges which may be mentioned by way of example are the elongated contact regions of in each case two wall surfaces of the container. In the container, the container walls preferably represent the surfaces of the container framed by the edges.

According to the above embodiments, the invention also provides the use of the planar composite according to the invention or of a container produced therefrom or comprising this composite for storage of foodstuffs, in particular of sterilized foodstuffs.

Test Methods:
I. General:

Unless specified otherwise herein, the parameters mentioned herein are measured by means of ISO specifications. These are, for determination of the MFR value: ISO 1133 (unless stated otherwise, at 190° C. and 2.16 kg);

the density: ISO 1183-1;

the melting temperature with the aid of the DSC method: ISO 11357-1, -5; if the sample is based on a mixture of several plastics and the determination of the melting temperature by the abovementioned method gives several peak temperatures $T_p$, the highest of the peak temperatures $T_{p,m}$ which is to be assigned to a plastic of the plastics mixture is defined as the melting temperature. The equipment is calibrated according to the manufacturer's instructions with the aid of the following measurements:

indium onset temperature heat of melting of indium zinc onset temperature the molecular weight distribution by gel permeation chromatography by means of light scattering: ISO 16014-3/-5;

the viscosity number of PA: ISO 307 in 95% sulphuric acid;

the oxygen permeation rate: ISO 14663-2 annex C at 20° C. and 65% relative atmospheric humidity the moisture content of the cardboard: ISO 287:2009 the Scott bond value: TAPPI T403 um

For determination of the adhesion of two adjacent layers, these are fixed on a rotatable roll on a 90° peel test apparatus, for example from Instron "German rotating wheel fixture", which rotates at 40 mm/min during the measurement. The samples were cut to size in 15 mm wide strips beforehand. On one side of the sample the layers are detached from one another and the detached end is clamped in a tensioning device directed perpendicularly upwards. A measuring apparatus for determining the tensile force is attached to the tensioning device. On rotation of the roll, the force necessary to separate the layers from one another is measured. This force corresponds to the adhesion of the layers to one another and is stated in N/15 mm. The separation of the individual layers can be carried out, for example, mechanically, or by a targeted pretreatment, for example by softening the sample for 3 min in 60° C. hot 30% acetic acid.

Pipette test: In this, at least 10 drops of 5 µl each of distilled water are applied to the surface to be tested and the drop size is determined.

II. Damping Factor Difference by Means of Linear Viscoelastic Measurements

The determination of the damping factor difference is described in the following. Information on equipment, sample preparation, procedure and evaluation is provided for this.

Test Apparatus:
The shear rheology investigations were carried out on a Physica MCR 501 rotary rheometer (Anton Paar, Graz). The measurement are made with a plate-plate geometry (plate diameter 25 mm, gap 0.8 mm; type PP25/P2(19111)).

Production of the Test Specimens:
In a twin-screw extruder (Thermo Scientific Haake Rheomex OS PTW 16/25 OS diameter D: 16 mm; L/D: 25) in each case one kilogram of the materials thoroughly mixed beforehand is extruded. The following temperature profile is used here: T1=160-170° C.; T2-6=170-180° C. The speed of rotation of the screws is set at 120 revolutions per minute. After the compounding in the extruder, the melt strand is taken up on a conveyor belt and comminuted by a granulating unit. Test specimens in the form of a disc are then injection moulded from all the materials using a heated plunger injection moulding unit (Thermo Scientific Haake MiniJet II). For this, the plunger is heated to 170° C. and the cavity is heated to 50° C. The material is injected into the cavity under a pressure of 150 bar and after 10 seconds is after-pressed under 200 bar for 10 seconds. The test specimens produced have dimensions of 1.2 mm in height and 2.5 cm width.

Procedure:
The complex viscosity and the moduli (storage and loss modulus) are determined as a function of the angular frequency with frequency tests. The test specimens are conditioned at 170° C. for 4 min in the rheometer before the measurement starts. The frequency tests are carried out at between 125-0.06 rad/s (20-0.01 Hz) with a deformation amplitude of y=5%. Within this range, 11 measurement points are recorded at 170° C. in the linear viscoelastic range. A triplicate determination is performed for each specimen.

Calculation of the Damping Factor Difference:
Storage Modulus G' and Loss Modulus G":

$$\text{Storage modulus } G' = \frac{2hM_{Real}}{\pi R^4}$$

$$\text{Loss modulus } G'' = \frac{2hM_{Imag}}{\pi R^4}$$

$$\text{Damping factor } \delta = \arctan\frac{G''}{G'}$$

Damping Factor Difference (Between 0.01 and 0.1 Hz):

$$\text{Damping factor difference} = \frac{\log(\tan\delta)_{f''} - \log(\tan\delta)_{f'}}{\log f'' - \log f'} = \log(\tan\delta)_{f''=0,1Hz} - \log(\tan\delta)_{f'=0,01Hz}$$

III. Determination of the Elongation at Break of Bodies of Plastic: EN ISO 527-Part 1 to 3

Supplementary to the Above EN ISO:
Test Apparatus:
TIRAtest TT27025 (TIRA GmbH; D-96528 Schalkau)
Test specification: Tensile test plastics EN ISO 527

Test Specimens:
The form of the test specimens for the determination of the elongation at break is a strip which is 15 mm wide and no shorter than 90 mm.

Production of the Test Specimens:
The laminate is separated in the cardboard layer. The inner layer of the laminate which has been separated off is laid in a 30% acetic acid bath at 60° C. for 15 min. The laminate is covered completely. The polyethylene inner film and the polyethylene laminating film are then detached under running water. Both are to be dried thoroughly. The outer film is laid in ethyl acetate for one minute. The detachment is then carried out. The test specimens described are cut or stamped out such that the edges are smooth and free from notches; it is advisable to check the absence of notches under a low magnification. At least five test specimens must be tested in each test direction required.

Test Parameters:
Initial length L=40 mm (determined between the clamps)
Width b=15 mm
Test speed $V_0$=20 mm/min (until the pre-load $F_0$ is reached)
$V_1$=100 mm/min (measurement)
Pre-load $F_0$=0.1 N
Elongation at break last recorded elongation value before a drop in stress to less than or equal to 10% of the strength value takes place Calculation of the Yield Factor (%)

$$\text{Yield factor} = 10\left\{\frac{\log(\text{elongation at break } MD) + \log(\text{elongation at break } CD)}{2}\right\}$$

MD: Machine Direction; CD: Cross Direction

IV. Maximum Draw-Down Ratio

The greatest acceleration of the melt slip between the die opening and substrate before the film tears; calculated from the ratio of the distance between the die lips (here: 0.6 mm) and the thickness of the coated film. The higher the value, the more quickly a plastic can be coated in a stable manner.

$$\text{Draw-down ratio} = \frac{a}{b}$$

where: a=die gap [mm]; b=film thickness on the substrate [mm]

V. Neck-in

Constriction of the film width between the die opening and the substrate on each side of the film; calculated from the difference between the die width and the film width on the substrate. The lower the value, the more easily wide cardboard rolls can be coated, and the production unit can be utilized more effectively. For determination of the neck-in, the width of the film on the substrate is measured and the calculation is performed with the following formula:

$$\text{Neck-in} = \frac{a-b}{2}$$

Where: a=die width [mm]; b=film width on the substrate [mm]

EXAMPLES

The planar composites were produced with the aid of the coating process described above according to process steps S1.-S3. According to step S1., LDPEa granules (having a damping factor difference of −0.326, commercially obtainable from SABIC Europe BV) and LDPEt granules (having a damping factor difference of −0.457, commercially obtainable from LyondellBasell Deutschland GmbH) are provided to the extent of in each case 50 wt. %. The granules are mixed in a drum mixer at room temperature according to step S2. and fed to a screw extruder. For the planar composite according to Example 1, a carrier layer optionally having holes for closures or drinking straws is then initially laid down, on to which the PE blend from step S2. is applied according to step S3. This is carried out in a commercially available coating unit, on which the further layers listed in the following Table 1 were also generated.

TABLE 1

Composition of a container according to the invention

| Example 1 | Weight per unit area | |
| --- | --- | --- |
| PE blend | 20 g/m² | (3) |
| Carrier | 210 g/cm² | (2) Liquid packaging board from Stora Enso AB |
| PE blend | 22 g/m² | (3) |
| Adhesion promoter | 3 g/m² | 100 wt. % (7) |
| Barrier | 6 µm | (1) |
| Adhesion promoter | 4 g/m² | 100 wt. % (6) |
| PE blend | 22 g/m² | (3) |
| mPE blend | 10 g/m² | 70 wt. % (4)/30 wt. % (5) |

(1) Aluminium, EN AW 8079, thickness = 6 µm from Hydro Aluminium Deutschland GmbH
(2) Cardboard: Stora Enso Natura T Duplex Doppelstrich, Scott bond 200 J/m², residual moisture content 7.5%
(3) LDPEa/LDPEt blend—prepared as described above
(4) 19N from Ineos
(5) Affinity ® PT 1451G1 from Dow Chemicals
(6) Escor 6000 HSC Exxonmobil
(7) Novex M21N430 from Ineos PE blends from the LDPEs described in Table 2 can also be employed in a planar composite described above, LDPEa being mixed with LDPEt. The mixing ratios are to be found in Table 3, 4 and 5.

The following LDPEs were employed for the PE blends:

TABLE 2

PE blends used

| | Process | Damping factor difference (0.01 to 0.1 Hz): |
| --- | --- | --- |
| LDPEa 0A | autoclave reactor | −0.326 |
| LDPEa 0B | autoclave reactor | −0.359 |
| LDPEt 1 | tubular reactor | −0.447 |
| LDPEt 2 | tubular reactor | −0.510 |

The results from the draw-down test are shown in Table 3.

TABLE 3

Draw-down ratios of various PE blends

| LDPEt 1 or 2 wt. % in the blend | LDPEa wt. % in the blend | Draw-down ratio LDPEt 1 | Draw-down ratio LDPEt 2 |
| --- | --- | --- | --- |
| 100 | 0 | 363 | 388 |
| 80 | 20 | 377 | 393 |
| 65 | 35 | 299 | 283 |
| 50 | 50 | 160 | 191 |
| 0 | 100 | 101 | 101 |

Figure 8:
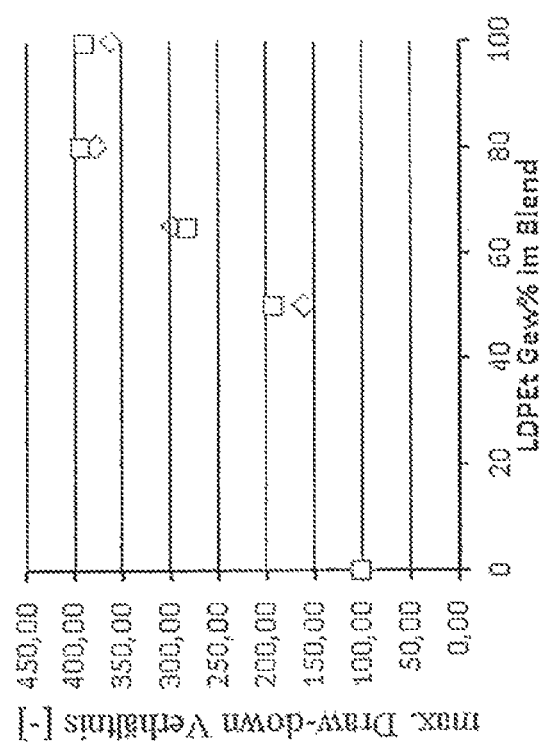
FIG. 8 is a diagram of the draw-down properties of LDPEa and LDPEt blends.

A combination of a PE having a Δ damping factor of >−0.4 and a PE having a Δ damping factor of <−0.4 brings advantages in the production of planar composites, as can also be seen from FIG. 8.

FIG. 8 shows that in a mixture with 50 and more wt. % of LDPEt, a significantly higher DDR is obtained. This allows a higher coating speed.

The results from the neck-in test are shown in Table 4.

TABLE 4

Neck-in ratios of various PE blends

| LDPEt 1 or 2 wt. % in the blend | LDPEa wt. % in the blend | Neck-in in mm LDPEt 1 | Neck-in in mm LDPEt 2 |
| --- | --- | --- | --- |
| 100 | 0 | 33 | 45 |
| 80 | 20 | 25 | 33 |
| 65 | 35 | 23 | 28 |
| 50 | 50 | 20 | 25 |
| 0 | 100 | 15 | 15 |

It has been found, surprisingly, that a blend of LDPEa and LDPEt shows a significantly lower neck-in value than the mean of the two pure LDPEs (in particular in the range of LDPEt content of between 50% and 90%, very specifically between 60% and 80%).

The interaction between the DDR and the neck-in is shown in Table 5. At a content of from 50 80 wt. % of LDPEt, a PE blend with particularly good processing properties is obtained.

TABLE 5

Effects of the draw-down ratios and the neck-in on the extrusion process

| Content of LDPEt | 0 wt. % | 50 wt. % | 80 wt. % | 100 wt. % |
| --- | --- | --- | --- | --- |
| Draw-down ratio | ○ | ++ | ++ | +++ |
| Neck-in | ++ | + | + | − |
| Processing properties | ○ | + | + | ○ |

A combination of an LDPEa having a damping factor difference of >−0.4 and an LDPEt 1 having a damping factor difference of <−0.4 brings additional advantages for the packaging container, in addition to the improved processing properties. These can be seen from Table 6, where the elongation at break of various PE blends determined by the above test method is shown.

TABLE 6

Elongation properties of PE blends having a varying content of PE1 and PE2

| LDPEt wt. % in the blend | LDPEa wt. % in the blend | Coating weight g/m² | Elongation at break in % MD | Elongation at break in % CD | Yield factor in % |
|---|---|---|---|---|---|
| 0 | 100 | 30 | 252 | 478 | 347 |
| 50 | 50 | 30 | 466 | 530 | 497 |
| 100 | 0 | 30 | 580 | 341 | 445 |

At a content of from 50 to 80 wt. % of LDPEt in the PE blend, a significantly improved yield factor is found. Planar composites comprising such PE blends can therefore be folded significantly better and at lower temperatures. Furthermore, the packaging containers produced in this way show an improved leakproofness. This applies in particular to the regions of the container which are folded at an angle μ, described in more detail in FIGS. 4a, 4b and 5a, 5b, of 100°.

Further examples include the production of further planar composites and further containers. Further planar composites were produced according to the process steps S1 to S3 as described in detail above under examples. Further blends i) and ii) applied to produce the further planar composites are given in Table 9. LDPEa and LDPEt contents of the further blends i) and ii) are given in Table 9. Table 10 gives storage and loss moduli as well as damping factor differences of these further blends. The further blends make use of a further LDPEa given in Table 7 and further LDPEt given in Table 8. Table 7 provides storage and loss moduli as well as a damping factor difference of the further LDPEa. Table 8 provides storage and loss moduli as well as damping factor differences of the further LDPEt. The further blends according to Table 9 were used to produce further containers according to Table 1. Therein, (3) was a further blend according to Table 9.

TABLE 7 damping properties of the further LDPEa

| trade name of further LDPEa | storage modulus G'(0.1 Hz) in Pa | storage modulus G'(0.01 Hz) in Pa | loss modulus G"(0.1 Hz) in Pa | loss modulus G"(0.01 Hz) in Pa | damping factor difference |
|---|---|---|---|---|---|
| Ineos 23L430 | 982 | 83 | 2093 | 389 | −0.340 |

TABLE 8 damping properties of further LDPEt

| trade name of further LDPEt | storage modulus G'(0.1 Hz) in Pa | storage modulus G'(0.01 Hz) in Pa | loss modulus G"(0.1 Hz) in Pa | loss modulus G"(0.01 Hz) in Pa | damping factor difference |
|---|---|---|---|---|---|
| Sabic LDPE 2404 TN00 | 1151 | 81 | 2311 | 426 | −0.420 |
| Basell Lupolen 2420K | 992 | 59 | 2287 | 384 | −0.449 |

TABLE 9 contents of further blends according to the invention

| further blend | content of further LDPEt based on further blend | content of further LDPEa based on further blend |
|---|---|---|
| i) | 70 wt. % Basell Lupolen 2420K | 30 wt. % Ineos 23L430 |
| ii) | 70 wt. % Sabic LDPE 2404 TN00 | 30 wt. % Ineos 23L430 |

TABLE 10 damping properties of the further blends according to the invention

| further blend | storage modulus G'(0.1 Hz) in Pa | storage modulus G'(0.01 Hz) in Pa | loss modulus G"(0.1 Hz) in Pa | loss modulus G"(0.01 Hz) in Pa | damping factor difference |
|---|---|---|---|---|---|
| i) | 1004 | 62 | 2295 | 388 | −0.435 |
| ii) | 1156 | 80 | 2332 | 413 | −0.407 |

Results regarding to the interaction between the DDR and the neck-in are shown in Table 11 for the further examples. At a content of 70 wt. % of the further LDPEt based on the further blend, a further blend with particularly good processing properties is obtained.

TABLE 11

Effects of the draw-down ratios and the neck-in on the extrusion process

| | further blend | |
|---|---|---|
| | i) 70 wt. % Basell Lupolen 2420K | ii) 70 wt. % Sabic LDPE 2404 TN00 |
| content of further LDPEt | | |
| draw-down ratio | ++ | ++ |
| neck-in | + | + |
| processing properties | + | + |

The present invention is now explained in more detail by these drawings given by way of example which do not limit it, the figures showing FIG. 1 shows a container 2 surrounding an interior 1 and made of a planar composite 3. The container 2 is shown with the container upper side 12 facing upwards. The container 2 is made of the planar composite 3 which includes at least the carrier layer 4. The container 2 can furthermore include a hole in the form of an opening or perforation 36.

Figure 2:
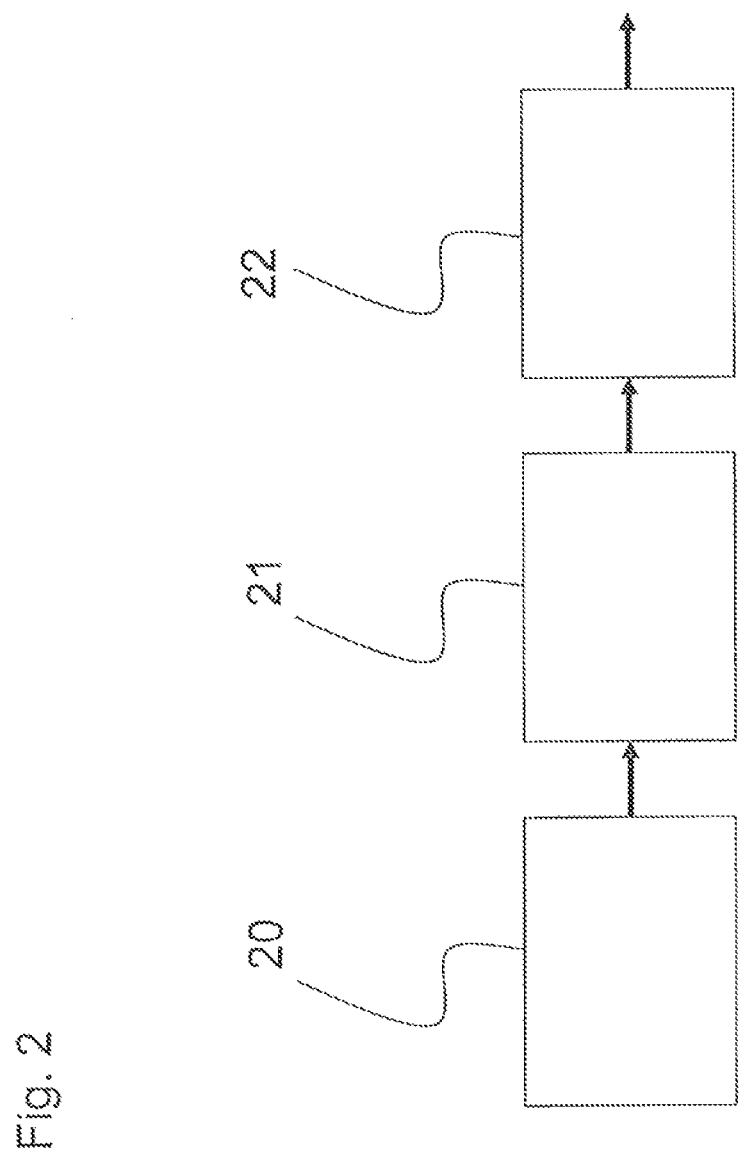
FIG. 2 is a process flow diagram of the process according to the invention.

FIG. 2 shows a flow diagram of devices and production steps by the process according to the invention. In a first step S1., the provision step 20, a first LDPEa having a damping factor difference of greater than −0.4 and a further LDPEt having a damping factor difference of less than −0.4 are thus provided. In this case they are provided in each case in the form of dry granules of the two LDPEs. LDPEa and LDPEt are mixed in a ratio of 1:1 in a drum mixer in a mixing step 21 which indirectly or directly follows the provision step 20. In an application step 21, the thermoplastic in the form of the PE blend is then applied as the first PE blend layer 13 or further PE blend layer 35 to a composite precursor 45. In this example the composite precursor comprises at least the carrier layer 4. This application step 22 can be followed by further steps in succession or at the same time. This can be, for example, the application of a further PE blend layer as wells as the application of the barrier layer 5, for example in the form of an aluminium layer. This can be followed in turn by a container production, in which in particular the folding and joining are carried out. Filling with a foodstuff can also be carried out here.

Figure 3:
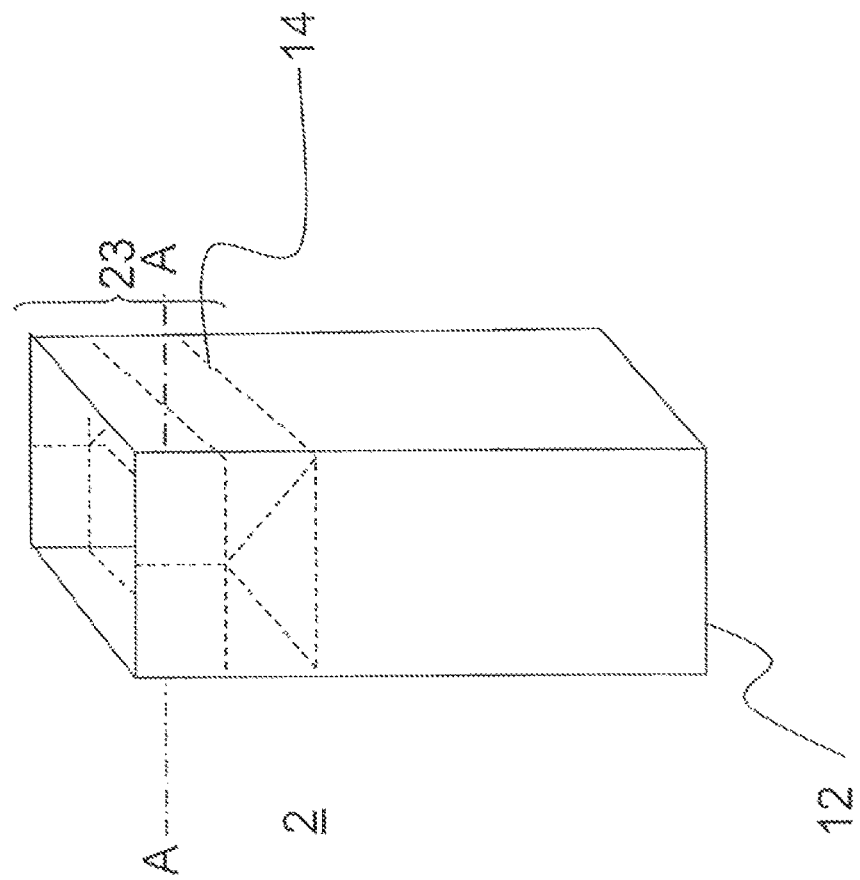
FIG. 3 is a diagram of a region of a container to be produced by the process according to the invention.

FIG. 3 shows a container 2 formed during the process according to the invention, which—for a better view—is shown with a container region 23 envisaged for a base 12 on the top. The container region 23 envisaged for the base 12 has a plurality of scores 14.

Figure 4:
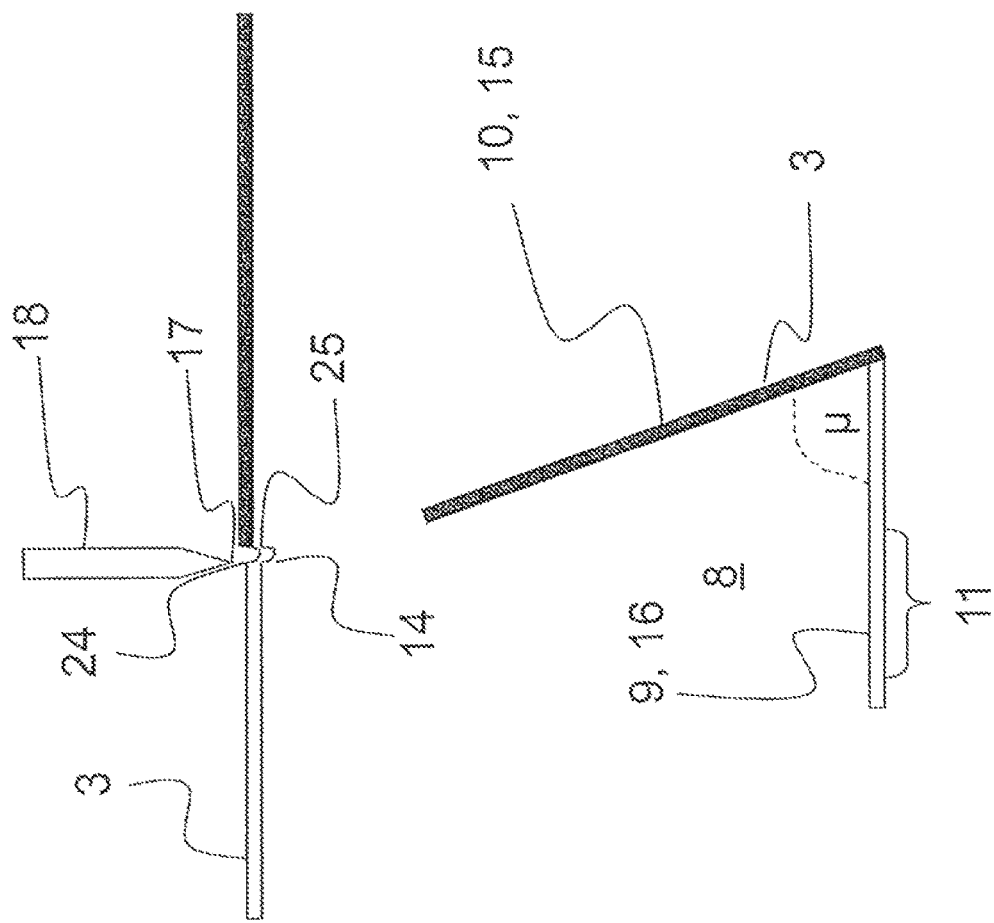
FIG. 4a is a diagram of folding by the process according to the invention.
FIG. 4b is a diagram of a fold by the process according to the invention.

FIG. 4a shows the cross-section through a planar composite 3 with a score 14, formed by a recess 24 and a bulge 25. An edge 17 of a folding tool 18 is provided above the recess 24, in order to engage in the recess 24, so that folding, preferably in a temperature range of from 10 to 50° C., can be carried out around the edge 17 along the score 14, in order to obtain a fold 8 shown as a cross-section in FIG. 4b. This fold 8 has two fold surfaces 9 and 10 which enclose an angle μ and are present as a part 15 of large area and a part 16 of small area. At least one layer of thermoplastic in the form of the PE blend layers 6, 7 or 13 is melted in a part region 11 of the part 16 of small area. By pressing the fold surfaces 9, 10 together, reducing the angle μ to 0, the two fold surfaces 9, 10 are joined to one another by sealing.

Figure 5:
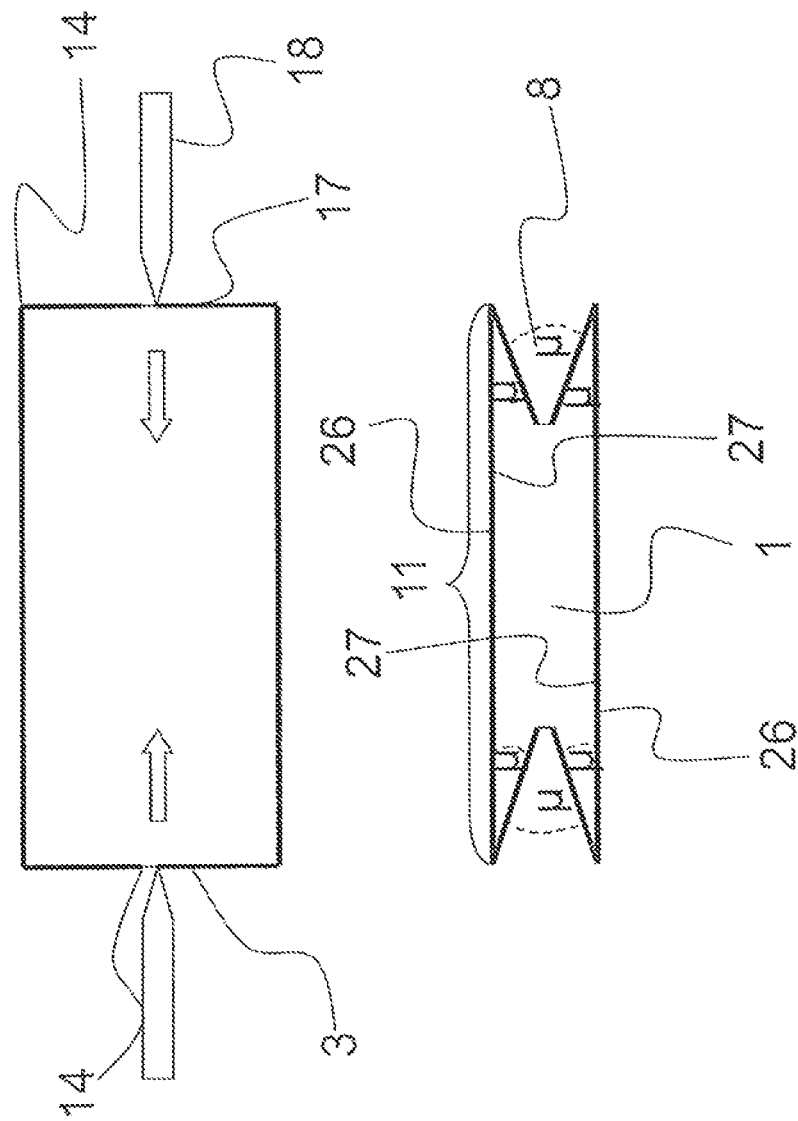
FIG. 5a is a diagram along a section A-A in the unfolded state.
FIG. 5b is a diagram along a section A-A in the folded state.

FIG. 5a shows a section along the line A-A in FIG. 3, before folding, from a planar composite 3 with scores 14. By edges 17 of folding tools 18 which engage in the scores 14 installed centrally on the front faces, the scores 14 are moved in the direction of the two arrows, as a result of which the folds 8, preferably in a temperature range of from 10 to 50° C., shown in FIG. 5b with the angles μ are formed. The section shown here through the outermost part to be folded of the container region envisaged for the base 12 of the container 2 has a part region 11 towards the interior 1 in which at least one layer of thermoplastic 6, 7 or 13 is melted. By pressing together the longitudinal sides 26, reducing the six angles μ to 0°, the two inner surfaces 27 of the longitudinal sides 26 facing the interior 1 are joined to one another by sealing, in order thus to create the base 12.

Figure 6:
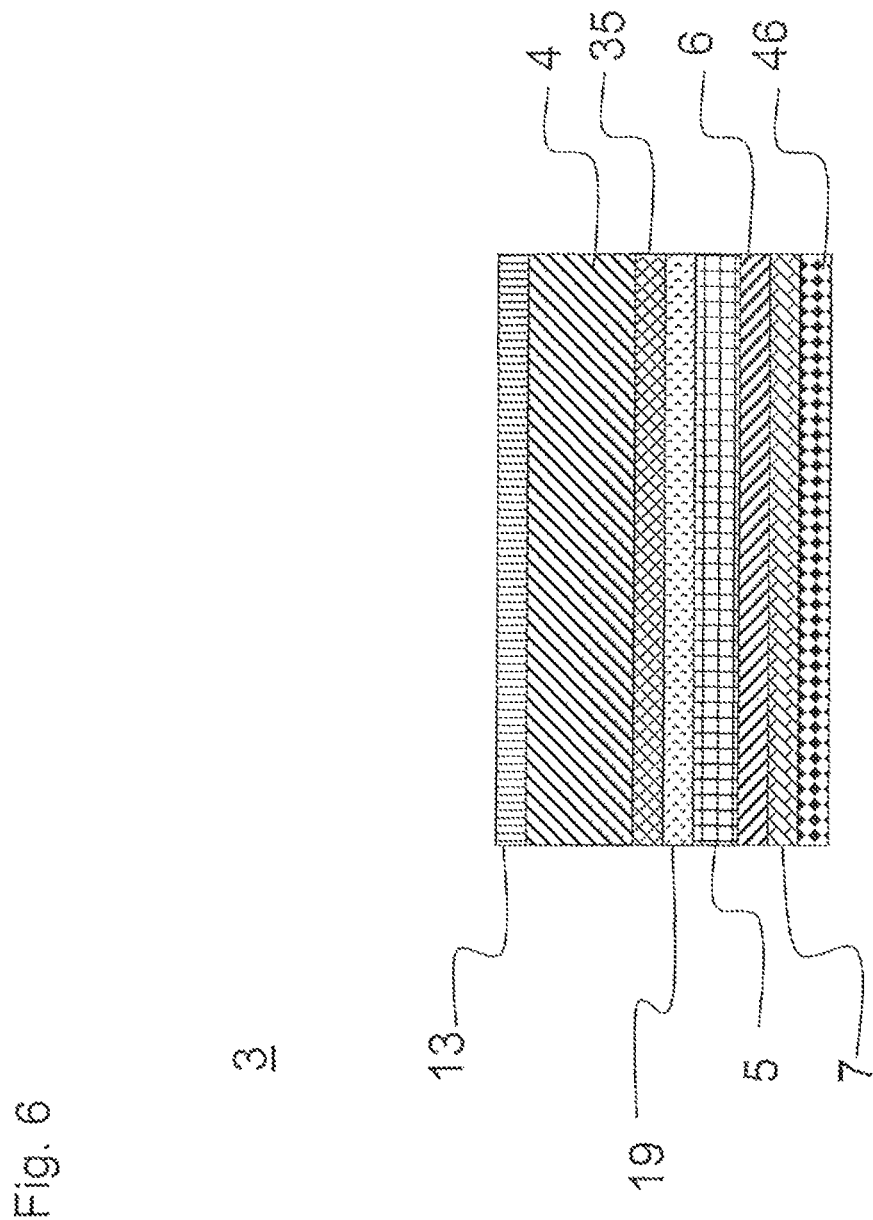
FIG. 6 is a diagram of a planar composite which can be employed in the process according to the invention.

FIG. 6 shows a planar composite 3, the upper side lying on the outside of the container 2 produced therefrom and the under-side lying on the inside. The resulting construction from the outside inwards is as follows: first PE blend layer 13 (LDPEa granules (having a damping factor difference of −0.326, commercially obtainable from SABIC Europe BV) and LDPEt granules (having a damping factor difference of −0.457, commercially obtainable from LyondellBasell Deutschland GmbH)) having a weight per unit area in a range of from 8 to 60 g/m², followed by a carrier layer 4 of the cardboard in Table 1 having a weight per unit area in a range of from 120 to 400 g/m², followed by a further PE blend layer 35, which is built up in exactly the same way as PE blend layer 13, usually having a weight per unit area in a range of from 5 to 50 g/m², followed by a layer of adhesion promoter as in Table 1 having a weight per unit area in a range of from 2 to 30 g/m², followed by a barrier layer 5, for example an aluminium foil having a thickness of 6 μm, as in Table 1, optionally followed by an adhesion promoter layer, as in Table 1, 6, optionally followed by a third PE layer 7 having a weight per unit area in a range of from 2 to 60 g/m². Finally, a further PE layer can also be present, comprising an mPE blend 30/70 (cf. Table 1). The planar composite 3 shown here can preferably be produced by the process described in FIG. 2 with simultaneous extrusion, called co-extrusion, of layers 35 and 19. Some or all of the other layers 5, 6, 7 or 46 can also be extruded in succession or applied at the same time in a co-extrusion process. In a further embodiment of this Figure, the layer 7 is composed as a PE blend layer like the PE blend layers 13 and 35.

Figure 7:
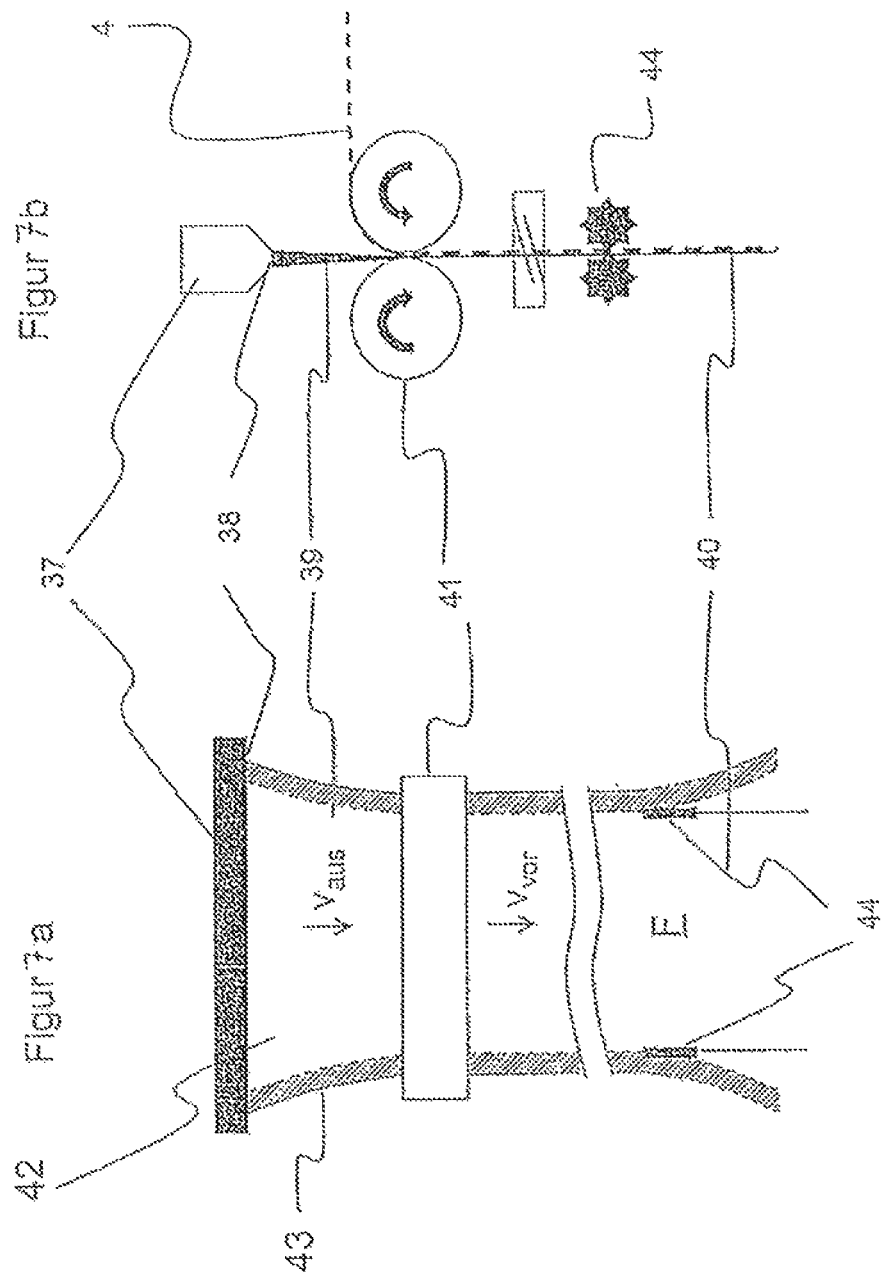
FIG. 7a is an extrusion process (top).
FIG. 7b is an extrusion process (side).

FIG. 7 shows the coating process preferred according to the invention in diagram form 7a. from the front and 7b. from the side. The coating film in the molten state 39 exits the extruder die slot 38 of an extruder die 37 and is applied to the carrier layer 4 via the cooling and pressing rolls 41. The coating film forms the area F which comprises the polymer P1 42, which is followed by a neck-in region 43, which forms the edge regions of the area F. The neck-in region 43 of the area F can be separated off from the area F by cutting tools 44, preferably shearing blades. The molten coating film 39 exits the extruder die 37 with the speed $V_{exit}$ and is accelerated to the speed $V_{adv}$ by the cooling and pressing rolls and thus stretched monoaxially.

FIG. 8 shows a diagram of the behaviour of the draw-down ratio of various mixtures of LDPEa and LDPEt. As already described above, two different LDPEt, which were mixed with an LDPEa in 5 different mixing ratios, were employed here. The mixing ratios are thus plotted on the x-axis 50 and the values for the draw-down ratio on the y-axis 52. The squares 54 represent the values for the first LDPEt 54, which has a damping factor difference of −0.447. The diamonds 56 represent the values of the second LDPEt 56. In both cases an LDPEa which has a damping factor difference of −0.326 was used in the PE blend investigated. These values are also to be found in Table 1 from the examples.

Figure 9:
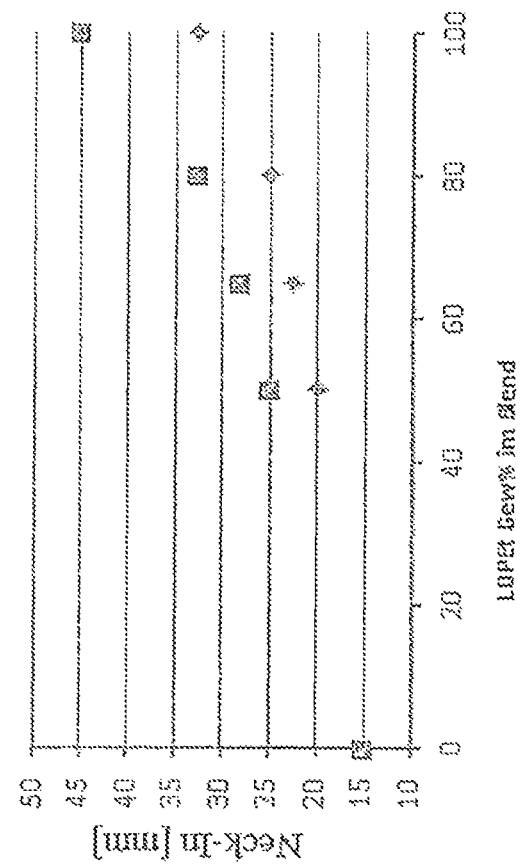
FIG. 9 is a diagram of the neck-in properties of LDPEa and LDPEt blends.

The different neck-in properties of various mixtures of LDPEa and LDPEt are shown in FIG. 9. The mixtures which were used for this were the same as those used in the experiments for FIG. 8. Here also it is to be clearly seen that the values for the first LDPEt (PE1) 54 and the second LDPEt (PE2) 56 do not lie on a straight line between the 0 and 100 wt. % of the LDPEt for the mixture having in each case 40 to 80 wt. %.

The invention claimed is:

1. A planar composite comprising as a layer sequence:
 a carrier layer; and
 a barrier layer,
 wherein the layer sequence comprises a first PE blend layer;
 wherein the first PE blend layer comprises in a range of from 10 to 50 wt. % of a first LDPEa, and a further LDPEt to the extent of at least 50 wt. %, in each case based on the blend; and
 wherein the first PE blend layer has a damping factor difference in a range of from −0.3 to −0.6,
 wherein the damping factor difference calculated from:

damping factor difference=log(tan δ)$_{f=0.1\ Hz}$−log(tan δ)$_{f=0.01\ Hz}$, wherein the damping factor δ is defined by: damping factor δ=arctan(G"/G'),
 wherein G' is the storage modulus and G" is the loss modulus, wherein G' and G" are determined from shear rheology measurements conducted with a plate-plate geometry, at a sample temperature of 170° C. and a deformation amplitude of y=5%.

2. The planar composite according to claim 1, wherein the layer sequence comprises a further PE blend layer;
    wherein the further PE blend layer comprises in a range of from 10 to 50 wt. % of a first LDPEa, and a further LDPEt to the extent of at least 50 wt. %, in each case based on the blend; and
    wherein the further PE blend layer has a damping factor difference in a range of from −0.3 to −0.6.

3. The planar composite according to claim 1, wherein an additional PE blend layer is provided between the carrier layer and the barrier layer;
    wherein the additional PE blend layer comprises in a range of from 10 to 50 wt. % of a first LDPEa, and a further LDPEt to the extent of at least 50 wt. %, in each case based on the blend.

4. The planar composite according to claim 1, wherein the first LDPEa has a damping factor difference of greater than −0.4; and
    wherein the further LDPEt has a damping factor difference of less than −0.4.

5. The planar composite according to claim 1, wherein the carrier layer comprises a cardboard.

6. The planar composite according to claim 1, wherein the first LDPEa or the further LDPEt has a mass density in a range of from 0.915 g/cm$^3$ to 0.940 g/cm$^3$.

7. The planar composite according to claim 1, wherein the barrier layer is one or a combination of at least two of a barrier layer of plastic, a metal layer, and a metal oxide layer.

8. The planar composite according to claim 1, wherein the carrier layer has at least one hole which is covered at least with the barrier layer and at least with the first PE blend layer, a further PE blend layer, or an additional PE blend layer or a combination of at least two of these as a hole-covering layer.

9. A process for the production of a planar composite, wherein the planar composite comprises a carrier layer and a barrier layer, the process comprising the steps of:
    provision of a first LDPEa and a further LDPEt,
    wherein the first LDPEa has a damping factor difference of greater than −0.4, and wherein the further LDPEt has a damping factor difference of less than −0.4;
    mixing of the first LDPEa and the further LDPEt to give a PE blend,
    wherein the PE blend has a damping factor difference in a range of from −0.3 to −0.6,
    wherein the PE blend comprises in a range of from 10 to 50 wt. %, in each case based on the blend, the first LDPEa, and the further LDPEt to the extent of at least 50 wt. %, in each case based on the PE blend;
    application of the PE blend to a composite precursor, wherein the composite precursor comprises a carrier layer;
    wherein the damping factor difference is calculated from:

damping factor difference=log(tan δ)$_{f'=0.1\ Hz}$−log(tan δ)$_{f'=0.01\ Hz}$, wherein the damping factor δ is defined by: damping factor δ=arctan(G"/G'),
    wherein G' is the storage modulus and G" is the loss modulus,
    wherein G' and G" are determined from shear rheology measurements conducted with a plate-plate geometry, at a sample temperature of 170° C. and a deformation amplitude of y=5%.

10. The process according to claim 9, wherein the mixing is carried out in a melt including the first LDPEa and the further LDPEt.

11. The process according to claim 9, wherein the application is carried out through a slot.

12. The process according to claim 11, wherein the slot and the composite precursor move relative to one another.

13. A planar composite obtainable by a process for the production of a planar composite, wherein the planar composite comprises a carrier layer and a barrier layer, the process comprising the steps of:
    provision of a first LDPEa and a further LDPEt,
    wherein the first LDPEa has a damping factor difference of greater than −0.4, and wherein the further LDPEt has a damping factor difference of less than −0.4;
    mixing of the first LDPEa and the further LDPEt to give a PE blend,
    wherein the PE blend comprises in a range of from 10 to 50 wt. %, in each case based on the blend, the first LDPEa, and the further LDPEt to the extent of at least 50 wt. %, in each case based on the PE blend;
    application of the PE blend to a composite precursor, wherein the composite precursor comprises a carrier layer;
    wherein the damping factor difference is calculated from:

damping factor difference=log(tan δ)$_{f'=0.1\ Hz}$−log(tan δ)$_{f'=0.01\ Hz}$, wherein the damping factor δ is defined by: damping factor δ=arctan(G"/G'),
    wherein G' is the storage modulus and G" is the loss modulus,
    wherein G' and G" are determined from shear rheology measurements conducted with a plate-plate geometry, at a sample temperature of 170° C. and a deformation amplitude of y=5%,
    wherein the PE blend has a damping factor difference in a range of from −0.3 to −0.6.

14. A container which surrounds an interior and comprises at least one planar composite according to claim 1.

15. A process for the production of a container which surrounds an interior, the process comprising the steps of:
    provision of a planar composite according to claim 1;
    folding of the planar composite to form a fold having at least two fold surfaces adjacent to one another,
    wherein a further PE layer faces the interior of the container;
    joining at least a part of the at least two fold surfaces to form a container region; and
    closing of the folded, planar composite with a closing tool.

16. The process according claim 15, wherein the folding is carried out in a temperature range of from 10 to 50° C.

17. The process according claim 15, wherein the joining step is carried out by irradiation, contact with a hot solid, by mechanical vibration or hot gas or a combination of at least two of these.

18. The process according to claim 15, wherein the container is filled with a foodstuff before the folding step or after the joining step.

19. The process according to claim 15, wherein the planar composite has at least one score and the fold is effected along the score.

20. A container obtainable by a process for the production of a container which surrounds an interior, the process comprising the steps of:
- provision of a planar composite according to claim 1;
- folding of the planar composite to form a fold having at least two fold surfaces adjacent to one another,
- wherein a further PE layer faces the interior of the container;
- joining at least a part of the at least two fold surfaces to form a container region; and
- closing of the folded, planar composite with a closing tool.

* * * * *